(12) United States Patent
Jen et al.

(10) Patent No.: US 10,591,918 B2
(45) Date of Patent: Mar. 17, 2020

(54) FIXED SEGMENTED LATTICE PLANNING FOR A MOBILE AUTOMATION APPARATUS

(71) Applicant: SYMBOL TECHNOLOGIES, LLC, Lincolnshire, IL (US)

(72) Inventors: Kevin C. Jen, Markham (CA); Harsoveet Singh, Mississauga (CA); Stephen L. Smith, Kitchener (CA)

(73) Assignee: Symbol Technologies, LLC, Holtsville, NY (US)

( * ) Notice: Subject to any disclaimer, the term of this patent is extended or adjusted under 35 U.S.C. 154(b) by 116 days.

(21) Appl. No.: 15/583,773

(22) Filed: May 1, 2017

(65) Prior Publication Data
US 2018/0314260 A1 Nov. 1, 2018

(51) Int. Cl.
*G01C 21/20* (2006.01)
*G05D 1/00* (2006.01)
(Continued)

(52) U.S. Cl.
CPC .......... *G05D 1/0214* (2013.01); *G01C 21/20* (2013.01); *G01C 21/206* (2013.01);
(Continued)

(58) Field of Classification Search
CPC .. G05D 1/0214; G05D 1/0276; G05D 1/0274; G05D 1/0088; G05D 1/0221; G01C 21/206; G01C 21/20; H04L 67/12
See application file for complete search history.

(56) References Cited

U.S. PATENT DOCUMENTS

| 5,214,615 A | 5/1993 | Bauer |
| 5,408,322 A | 4/1995 | Hsu et al. |

(Continued)

FOREIGN PATENT DOCUMENTS

| CA | 2835830 | 11/2012 |
| CA | 3028156 | 1/2018 |

(Continued)

OTHER PUBLICATIONS

Likhachev, Maxim, and Dave Ferguson. "Planning long dynamically feasible maneuvers for autonomous vehicles." The International Journal of Robotics Research 28.8 (2009): 933-945. (Year: 2009).*

(Continued)

*Primary Examiner* — Alan D Hutchinson

(57) ABSTRACT

Fixed segmented lattice planning for a mobile automation apparatus is provided. A mobile automation apparatus is provisioned with a plurality of segments for a plurality of paths through an environment, each of the plurality of segments being fixed in a reference frame, the plurality of segments arranged in a lattice configuration, with adjacent segments defining fixed nodes in the lattice configuration. The apparatus navigates through the environment on a segment-by-segment basis, storing control inputs and error signals for each segment and then later, when again navigating a segment using stored control inputs and error signals to generate current control inputs, along with current error signals, and storing the current control inputs and the current error signals. Indeed, each time the apparatus navigates a segment in the lattice configuration, the control inputs and the error signals are updated to refine navigation through the environment at each navigation through a segment.

18 Claims, 11 Drawing Sheets

(51) Int. Cl.
  *G05D 1/02* (2006.01)
  *H04L 29/08* (2006.01)
(52) U.S. Cl.
  CPC ......... *G05D 1/0088* (2013.01); *G05D 1/0094* (2013.01); *G05D 1/0212* (2013.01); *G05D 1/0221* (2013.01); *G05D 1/0274* (2013.01); *G05D 1/0276* (2013.01); *H04L 67/12* (2013.01); *G05D 2201/0216* (2013.01)

(56) References Cited

U.S. PATENT DOCUMENTS

| | | | |
|---|---|---|---|
| 5,414,268 A | 5/1995 | McGee | |
| 5,534,762 A | 7/1996 | Kim | |
| 5,566,280 A | 10/1996 | Fukui et al. | |
| 5,953,055 A | 9/1999 | Huang et al. | |
| 5,988,862 A | 11/1999 | Kacyra et al. | |
| 6,026,376 A | 2/2000 | Kenney | |
| 6,034,379 A | 3/2000 | Bunte et al. | |
| 6,075,905 A | 6/2000 | Herman et al. | |
| 6,115,114 A | 9/2000 | Berg et al. | |
| 6,141,293 A | 10/2000 | Amorai-Moriya et al. | |
| 6,304,855 B1 | 10/2001 | Burke | |
| 6,442,507 B1 | 8/2002 | Skidmore et al. | |
| 6,580,441 B2 | 6/2003 | Schileru-Key | |
| 6,711,293 B1 | 3/2004 | Lowe | |
| 6,721,769 B1 | 4/2004 | Rappaport et al. | |
| 6,836,567 B1 | 12/2004 | Silver et al. | |
| 6,995,762 B1 | 2/2006 | Pavlidis et al. | |
| 7,090,135 B2 | 8/2006 | Patel | |
| 7,137,207 B2 | 11/2006 | Armstrong et al. | |
| 7,245,558 B2 | 7/2007 | Willins et al. | |
| 7,248,754 B2 | 7/2007 | Cato | |
| 7,277,187 B2 | 10/2007 | Smith et al. | |
| 7,373,722 B2 | 5/2008 | Cooper et al. | |
| 7,474,389 B2 | 1/2009 | Greenberg et al. | |
| 7,487,595 B2 | 2/2009 | Armstrong et al. | |
| 7,493,336 B2 | 2/2009 | Noonan | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,693,757 B2 | 4/2010 | Zimmerman | |
| 7,726,575 B2 | 6/2010 | Wang et al. | |
| 7,839,531 B2 | 11/2010 | Sugiyama | |
| 7,845,560 B2 | 12/2010 | Emanuel et al. | |
| 7,885,865 B2 | 2/2011 | Benson et al. | |
| 7,925,114 B2 | 4/2011 | Mai et al. | |
| 7,957,998 B2 | 6/2011 | Riley et al. | |
| 8,009,864 B2 | 8/2011 | Linaker et al. | |
| 8,049,621 B1 | 11/2011 | Egan | |
| 8,091,782 B2 | 1/2012 | Cato et al. | |
| 8,094,902 B2 | 1/2012 | Crandall et al. | |
| 8,094,937 B2 | 1/2012 | Teoh et al. | |
| 8,132,728 B2 | 3/2012 | Dwinell et al. | |
| 8,134,717 B2 | 3/2012 | Pangrazio et al. | |
| 8,189,855 B2 | 5/2012 | Opalach et al. | |
| 8,199,977 B2 | 6/2012 | Krishnaswamy et al. | |
| 8,207,964 B1 | 6/2012 | Meadow et al. | |
| 8,233,055 B2 | 7/2012 | Matsunaga et al. | |
| 8,265,895 B2 | 9/2012 | Willins et al. | |
| 8,284,988 B2 | 10/2012 | Sones et al. | |
| 8,423,431 B1 | 4/2013 | Rouaix et al. | |
| 8,429,004 B2 | 4/2013 | Hamilton et al. | |
| 8,463,079 B2 | 6/2013 | Ackley et al. | |
| 8,479,996 B2 | 7/2013 | Barkan et al. | |
| 8,520,067 B2 | 8/2013 | Ersue | |
| 8,542,252 B2 | 9/2013 | Perez et al. | |
| 8,599,303 B2 | 12/2013 | Stettner | |
| 8,630,924 B2 | 1/2014 | Groenevelt et al. | |
| 8,660,338 B2 | 2/2014 | Ma et al. | |
| 8,743,176 B2 | 6/2014 | Stettner et al. | |
| 8,757,479 B2 | 6/2014 | Clark et al. | |
| 8,812,226 B2 | 8/2014 | Zeng | |
| 8,923,893 B2 | 12/2014 | Austin et al. | |
| 8,939,369 B2 | 1/2015 | Olmstead et al. | |
| 8,954,188 B2 | 2/2015 | Sullivan et al. | |
| 8,971,637 B1 | 3/2015 | Rivard | |
| 8,989,342 B2 | 3/2015 | Liesenfelt et al. | |
| 9,007,601 B2 | 4/2015 | Steffey et al. | |
| 9,070,285 B1 | 6/2015 | Ramu et al. | |
| 9,129,277 B2 | 9/2015 | MacIntosh | |
| 9,135,491 B2 | 9/2015 | Morandi et al. | |
| 9,159,047 B2 | 10/2015 | Winkel | |
| 9,171,442 B2 | 10/2015 | Clements | |
| 9,329,269 B2 | 5/2016 | Zeng | |
| 9,349,076 B1 | 5/2016 | Liu et al. | |
| 9,367,831 B1 | 6/2016 | Besehanic | |
| 9,380,222 B2 | 6/2016 | Clayton et al. | |
| 9,396,554 B2 | 7/2016 | Williams et al. | |
| 9,400,170 B2 | 7/2016 | Steffey | |
| 9,424,482 B2 | 8/2016 | Patel et al. | |
| 9,549,125 B1 | 1/2017 | Goyal et al. | |
| 9,562,971 B2 | 2/2017 | Shenkar et al. | |
| 9,565,400 B1 | 2/2017 | Curlander et al. | |
| 9,600,731 B2 | 3/2017 | Yasunaga et al. | |
| 9,600,892 B2 | 3/2017 | Patel et al. | |
| 9,639,935 B1 | 5/2017 | Douady-Pleven et al. | |
| 9,697,429 B2 | 7/2017 | Patel et al. | |
| 9,778,388 B1 | 10/2017 | Connor | |
| 9,791,862 B1 | 10/2017 | Connor | |
| 9,805,240 B1 | 10/2017 | Zheng et al. | |
| 9,811,754 B2 | 11/2017 | Schwartz | |
| 9,928,708 B2 | 3/2018 | Lin et al. | |
| 10,019,803 B2 | 7/2018 | Venable et al. | |
| 10,127,438 B1 | 11/2018 | Fisher et al. | |
| 10,229,386 B2 | 3/2019 | Thomas | |
| 10,265,871 B2 | 4/2019 | Hance et al. | |
| 2001/0041948 A1 | 11/2001 | Ross et al. | |
| 2002/0006231 A1 | 1/2002 | Jayant et al. | |
| 2002/0097439 A1 | 7/2002 | Braica | |
| 2002/0158453 A1 | 10/2002 | Levine | |
| 2002/0164236 A1 | 11/2002 | Fukuhara et al. | |
| 2003/0003925 A1 | 1/2003 | Suzuki | |
| 2003/0174891 A1 | 9/2003 | Wenzel et al. | |
| 2004/0131278 A1 | 7/2004 | Imagawa et al. | |
| 2004/0240754 A1 | 12/2004 | Smith et al. | |
| 2005/0016004 A1 | 1/2005 | Armstrong et al. | |
| 2005/0114059 A1 | 5/2005 | Chang et al. | |
| 2005/0213082 A1 | 9/2005 | DiBernardo et al. | |
| 2005/0213109 A1 | 9/2005 | Schell et al. | |
| 2006/0032915 A1 | 2/2006 | Schwartz | |
| 2006/0045325 A1 | 3/2006 | Zavadsky et al. | |
| 2006/0106742 A1 | 5/2006 | Bochicchio et al. | |
| 2007/0074410 A1 | 4/2007 | Armstrong et al. | |
| 2007/0272732 A1 | 11/2007 | Hindmon | |
| 2008/0025565 A1 | 1/2008 | Zhang et al. | |
| 2008/0159634 A1 | 7/2008 | Sharma et al. | |
| 2008/0164310 A1 | 7/2008 | Dupuy et al. | |
| 2008/0175513 A1 | 7/2008 | Lai et al. | |
| 2008/0181529 A1 | 7/2008 | Michel et al. | |
| 2008/0238919 A1 | 10/2008 | Pack | |
| 2008/0294487 A1 | 11/2008 | Nasser | |
| 2009/0009123 A1 | 1/2009 | Skaff | |
| 2009/0024353 A1 | 1/2009 | Lee et al. | |
| 2009/0057411 A1 | 3/2009 | Madej et al. | |
| 2009/0059270 A1 | 3/2009 | Opalach et al. | |
| 2009/0060349 A1 | 3/2009 | Linaker et al. | |
| 2009/0063306 A1 | 3/2009 | Fano et al. | |
| 2009/0063307 A1 | 3/2009 | Groenovelt et al. | |
| 2009/0074303 A1 | 3/2009 | Filimonova et al. | |
| 2009/0088975 A1 | 4/2009 | Sato et al. | |
| 2009/0103773 A1 | 4/2009 | Wheeler et al. | |
| 2009/0125350 A1 | 5/2009 | Lessing et al. | |
| 2009/0125535 A1 | 5/2009 | Basso et al. | |
| 2009/0152391 A1 | 6/2009 | McWhirk | |
| 2009/0160975 A1 | 6/2009 | Kwan | |
| 2009/0192921 A1 | 7/2009 | Hicks | |
| 2009/0206161 A1 | 8/2009 | Olmstead | |
| 2009/0236155 A1 | 9/2009 | Skaff | |
| 2009/0252437 A1 | 10/2009 | Li et al. | |
| 2009/0323121 A1 | 12/2009 | Valkenburg et al. | |
| 2010/0026804 A1 | 2/2010 | Tanizaki et al. | |
| 2010/0070365 A1 | 3/2010 | Siotia et al. | |
| 2010/0091094 A1 | 4/2010 | Sekowski | |

(56) References Cited

U.S. PATENT DOCUMENTS

| | | |
|---|---|---|
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0075342 A1 | 3/2012 | Choubassi et al. |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Showering |
| 2014/0104413 A1 | 4/2014 | McCloskey et al. |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0262116 A1 | 9/2015 | Katircioglu et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0132815 A1 | 5/2016 | Ltoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171707 A1 | 6/2016 | Schwartz |
| 2016/0191759 A1 | 6/2016 | Somanath et al. |
| 2016/0253735 A1 | 9/2016 | Scudillo et al. |
| 2016/0328618 A1 | 11/2016 | Patel et al. |
| 2016/0353099 A1 | 12/2016 | Thomson et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0066459 A1 | 3/2017 | Singh |
| 2017/0074659 A1* | 3/2017 | Giurgiu .................. G01S 19/41 |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323376 A1 | 11/2017 | Glaser et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0053091 A1 | 2/2018 | Sawides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0293442 A1 | 10/2018 | Fridental et al. |
| 2018/0313956 A1 | 11/2018 | Rzeszutek et al. |

(56) References Cited

U.S. PATENT DOCUMENTS

| | | | |
|---|---|---|---|
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0180150 A1 | 6/2019 | Taylor et al. | |

FOREIGN PATENT DOCUMENTS

| | | |
|---|---|---|
| CN | 104200086 | 12/2014 |
| CN | 107067382 | 8/2017 |
| EP | 0766098 A1 | 4/1997 |
| EP | 1311993 B1 | 5/2007 |
| EP | 2309378 | 4/2011 |
| EP | 2439487 | 4/2012 |
| EP | 2472475 A1 | 7/2012 |
| EP | 2562688 | 2/2013 |
| EP | 2662831 A2 | 11/2013 |
| EP | 2693362 | 2/2014 |
| GB | 2323238 A | 9/1998 |
| GB | 2330265 A | 4/1999 |
| KR | 101234798 | 1/2009 |
| KR | 1020190031431 | 3/2019 |
| WO | 2003002935 | 1/2003 |
| WO | 2003025805 A1 | 3/2003 |
| WO | 2006136958 A3 | 12/2006 |
| WO | 2007042251 A2 | 4/2007 |
| WO | 2008057504 | 5/2008 |
| WO | 2008154611 | 12/2008 |
| WO | 2012103199 | 8/2012 |
| WO | 2012103202 | 8/2012 |
| WO | 2012154801 | 11/2012 |
| WO | 2013165674 | 11/2013 |
| WO | 2014066422 | 5/2014 |
| WO | 2014092552 | 6/2014 |
| WO | 2014181323 A1 | 11/2014 |
| WO | 2015127503 | 9/2015 |
| WO | 2016020038 | 2/2016 |
| WO | 2018018007 | 1/2018 |
| WO | 2019023249 | 1/2019 |

OTHER PUBLICATIONS

McNaughton, Matthew, et al. "Motion planning for autonomous driving with a conformal spatiotemporal lattice." Robotics and Automation (ICRA), 2011 IEEE International Conference on. IEEE, 2011. (Year: 2011).*
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
Bohm, "Multi-Image Fusion for Occlusion-Free Facade Texturing", International Archives of the Photogrammetry, Remote Sensing and Spatial Information Sciences, pp. 867-872 (Jan. 2004).
Senthilkumaran, et al., "Edge Detection Techniques for Image Segmentation—A Survey of Soft Computing Approaches", International Journal of Recent Trends in Engineering, vol. 1, No. 2 (May 2009).
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Uchiyama, et al., "Removal of Moving Objects from a Street-View Image by Fusing Multiple Image Sequences", Pattern Recognition, 2010, 20th International Conference on, IEEE, Piscataway, NJ, pp. 3456-3459 (Aug. 23, 2010).
Tseng, et al., "A Cloud Removal Approach for Aerial Image Visualization", International Journal of Innovative Computing, Information & Control, vol. 9 No. 6, pp. 2421-2440 (Jun. 2013).

United Patent Kingdom Intellectual Property Office, Combined Search and Examination Report dated Mar. 11, 2015 for GB Patent Application No. 1417218.3.
United Kingdom Intellectual Property Office, Examination Report dated Jan. 22, 2016 for GB Patent Application No. 1417218.3 (2 pages).
United Kingdom Intellectual Property Office, Combined Search and Examination Report dated Jan. 22, 2016 for GB Patent Application No. 1521272.3 (6 pages).
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 15/211,103 dated Apr. 5, 2017.
Notice of allowance for U.S. Appl. No. 14/518,091 dated Apr. 12, 2017.
U.S. Appl. No. 15/583,680, filed May 1, 2017.
U.S. Appl. No. 15/583,801, filed May 1, 2017.
U.S. Appl. No. 15/583,740, filed May 1, 2017.
U.S. Appl. No. 15/583,759, filed May 1, 2017.
U.S. Appl. No. 15/583,717, filed May 1, 2017.
U.S. Appl. No. 15/583,786, filed May 1, 2017.
International Patent Application Serial No. PCT/CN2017/083143 filed May 5, 2017.
Bristow et al., "A Survey of Iterative Learning Control", IEEE Control Systems, Jun. 2006, pp. 96-114.
Kang et al., "Kinematic Path-Tracking of Mobile Robot Using Iterative Learning Control", Journal of Robotic Systems, 2005, pp. 111-121.
Norrlof et al., "Experimental comparison of some classical Iterative Learning Control algorithms", IEEE Transactions on Robotics and Automation, Jun. 2002, pp. 636-641.
Oriolo et al., "An Iterative Learning Controller for Nonholonomic Mobile Robots", The International Journal of Robotics Research, Aug. 1997, pp. 954-970.
Ostafew et al., "Visual Teach and Repeat, Repeat, Repeat: Iterative Learning Control to Improve Mobile Robot Path Tracking in Challenging Outdoor Environments", IEEE/RSJ International Conference on Intelligent Robots and Systems, Nov. 2013, pp. 176-181.
Pivtoraiko et al., "Differentially Constrained Mobile Robot Motion Planning in State Lattices", Journal of Field Robotics, vol. 26, No. 3, 2009, pp. 308-333.
Dubois, M., et al., 'A comparison of geometric and energy-based point cloud semantic segmentation methods, European Conference on Mobile Robots (ECMR), pp. 88-93, 25-27, Sep. 2013.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.

(56) References Cited

OTHER PUBLICATIONS

International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kay et al. "Ray Tracing Complex Scenes." ACM SIGGRAPH Computer Graphics, vol. 20, No. 4, ACM, pp. 269-278, 1986.
Kelly et al., "Reactive Nonholonoic Trajectory Generation via Parametric Optimal Control", International Journal of Robotics Research, vot. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Marder-Eppstein et al., "The Office Marathon: robust navigation in an indoor office environment," IEEE, 2010 International conference on robotics and automation, May 3-7, 2010, pp. 300-307.
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Olson, Clark F., etal. "Wide-Baseline Stereo Vision for terrain Mapping" in Machine Vision and Applications, Aug. 2010.
Park et al., "Autonomous mobile robot navigation using passiv rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Tenology, v2n10, Oct. 2013) (Year: 2013).
Pratt W K Ed: "Digital Image processing, 10-image enhacement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to invrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 © http://citeseerxist.psu.edu/viewdoc/download?doi=10.1.1.703.5365&rep=rep1&type=pdf, pp. 1-6.
United Kingdom Intellectual Property Office, "Combined Search and Examination Report" for GB Patent Application No. 1813580.6 dated Feb. 21, 2019.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.

(56) References Cited

OTHER PUBLICATIONS

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France.

Douillard, Bertrand, et al. "On the segmentation of 3D Lidar point clouds." Robotics and Automation (ICRA), 2011 IEEE International Conference on IEEE, 2011.

* cited by examiner

FIXED SEGMENTED LATTICE PLANNING FOR A MOBILE AUTOMATION APPARATUS

CROSS-REFERENCE TO RELATED APPLICATIONS

This application is related to U.S. Provisional Application No. 62/492,670 entitled "Product Status Detection System," filed on May 1, 2017, by Perrella et al., which is incorporated herein by reference in its entirety.

BACKGROUND OF THE INVENTION

Mobile automation apparatuses are increasingly being used in retail environments to perform pre-assigned tasks, such as inventory tracking. To perform these tasks, some mobile automation apparatuses rely on various sensors to navigate within the retail environment. As the mobile automation apparatus navigates the environment, tight positional constraints should be satisfied for the mobile automation apparatus to capture high quality imaging data. As such, the mobile automation apparatus generally attempts to follow a single, static predefined path that is believed to be optimal for its environment. However, due to the highly varying and dynamic nature of a retail environment, a mobile automation apparatus often deviates from the single predefined path to avoid obstacles in arbitrary locations. When such deviations occur, under a conventional approach, the deviated path cannot use the learned control inputs, nor will the mobile automation apparatus attempt to learn control inputs along the deviation. Instead, the mobile automation apparatus will simply attempt to navigate back to the single predefined optimal path.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
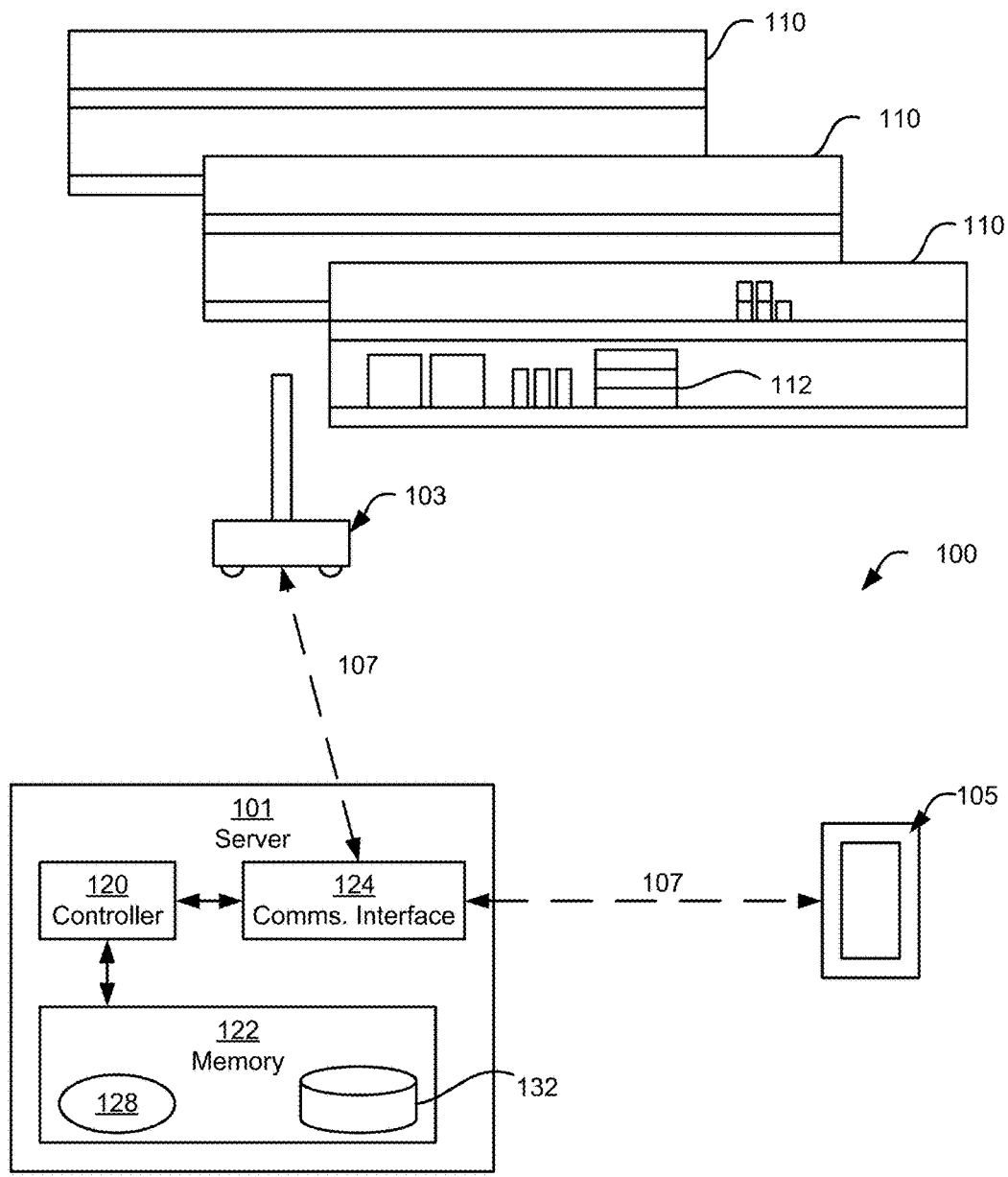
FIG. 1 is a block diagram of a mobile automation system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a mobile automation apparatus comprising: a memory storing a plurality of segments for a plurality of paths through an environment, each of the plurality of segments being fixed in a reference frame, and extending between fixed nodes arranged in a lattice configuration; a navigation module having at least one motor configured to move the mobile automation apparatus in the environment; and a navigation controller configured to: as navigation occurs a first time along each of respective segments using the navigation module, store, in the memory, control inputs and error signals for the navigation module in association with each of the respective segments; and, as navigation occurs at least a second time along a given segment: generate current control inputs for the given segment based on current error signals and the control inputs and the error signals stored in the memory for the given segment; and store the current control inputs and the current error signals in the memory in association with the given segment.

In some implementations, the mobile automation apparatus further comprises one or more obstacle avoidance sensors, wherein the navigation controller is further configured to: navigate along a first path using the control inputs and the error signals stored in the memory in association with each of the respective segments of the first path; when an obstacle is detected in the first path, using the one or more obstacle avoidance sensors: control the navigation module to navigate from a fixed node in the first path to a respective fixed node in a second path to avoid the obstacle, using a branch from the fixed node in the first path to the respective fixed node in the second path; and store, in the memory, the control inputs and the error signals for the navigation module in association with each of the respective segments for the second path; and, when the one or more obstacle avoidance sensors indicate that the mobile automation apparatus is past the obstacle: control the navigation module to navigate from a further respective fixed node in the second path to a further fixed node in the first path, using another branch from the further respective fixed node in the second path to the further fixed node in the first path; and store, in the memory, the control inputs and the error signals for the navigation module in association with each of the respective segments for the second path and the first path. In some of these implementations, the second path is one or more of:

adjacent to the first path; about parallel to the first path; and within a given constraint boundary.

In some implementations, the mobile automation apparatus further comprises a communication interface configured to receive a destination position in the environment, and wherein the navigation controller is further configured to: generate a path to the destination position using a subset of the plurality of segments. In some of these implementations, the navigation controller is further configured to: generate branches at each fixed node in the path, at least a portion of the branches comprising a branch from a fixed node in a first path to a respective fixed node in an adjacent path used to avoid obstacles in the path. In some of these implementations, the navigation controller is further configured to: generate branches at each fixed node in the path when the path is generated. In some of these implementations, the navigation controller is further configured to: generate branches at each fixed node in the path, each of the branches associated with a set of respective control inputs used by the navigation module to navigate from a respective fixed node in the path to one or more fixed nodes in adjacent paths.

In some implementations, the navigation controller is further configured to: determine the control inputs and the error signals for the navigation module using a learning controller; and generate the current control inputs using the learning controller.

In some implementations, the navigation controller is further configured to: determine when one or more constraints for navigating the given segment has been violated; and generate the current control inputs that keep the one or more constraints within respective threshold values.

In some implementations, the navigation controller is further configured to change a current path when one or more constraints for navigating the respective segments have been violated by navigating along an updated path that meets the one or more constraints.

In some implementations, the reference frame is associated with the environment.

In some implementations, the lattice configuration comprises the fixed nodes arranged in a periodic pattern in at least two orthogonal directions according to a given resolution.

In some implementations, the lattice configuration has a first resolution in a first region of the environment and a second resolution in a second region of the environment.

In some of these implementations, a resolution of the lattice configuration is dynamic, and the navigation controller is further configured to: change a resolution of the lattice configuration in a region to an updated resolution, and generate new control inputs and determine associated new error signals for each of updated segments in the lattice configuration at the updated resolution.

Another aspect of the specification provides a method comprising: at a mobile automation apparatus comprising: a memory storing a plurality of segments for a plurality of paths through an environment, each of the plurality of segments being fixed in a reference frame, and extending between fixed nodes arranged in a lattice configuration; a navigation module having at least one motor configured to move the mobile automation apparatus in the environment, as navigation occurs a first time along each of respective segments using the navigation module, storing, using the navigation controller, in the memory, control inputs and error signals for the navigation module in association with each of the respective segments; and, as navigation occurs at least a second time along a given segment: generating, using the navigation controller, current control inputs for the given segment based on current error signals and the control inputs and the error signals stored in the memory for the given segment; and storing, using the navigation controller, the current control inputs and the current error signals in the memory in association with the given segment.

In some implementations, the mobile automation apparatus further comprises one or more obstacle avoidance sensors, and the method further comprises: navigating, using the navigation controller, along a first path using the control inputs and the error signals stored in the memory in association with each of the respective segments of the first path; when an obstacle is detected in the first path, using the one or more obstacle avoidance sensors: controlling, using the navigation controller, the navigation module to navigate from a fixed node in the first path to a respective fixed node in a second path to avoid the obstacle, using a branch from the fixed node in the first path to the respective fixed node in the second path; and storing, using the navigation controller, in the memory, the control inputs and the error signals for the navigation module in association with each of the respective segments for the second path; and, when the one or more obstacle avoidance sensors indicate that the mobile automation apparatus is past the obstacle: controlling, using the navigation controller, the navigation module to navigate from a further respective fixed node in the second path to a further fixed node in the first path, using another branch from the further respective fixed node in the second path to the further fixed node in the first path; and storing, using the navigation controller, in the memory, the control inputs and the error signals for the navigation module in association with each of the respective segments for the second path and the first path.

In some implementations, the mobile automation apparatus further comprises a communication interface configured to receive a destination position in the environment, and wherein the method further comprises generating, using the navigation controller, a path to the destination position using a subset of the plurality of segments.

In some implementations, the method further comprises: determining the control inputs and the error signals for the navigation module using a learning controller; and generating the current control inputs using the learning controller.

In some implementations, the method further comprises: determining when one or more constraints for navigating the given segment has been violated; and generating the current control inputs that keep the one or more constraints within respective threshold values.

Another aspect of the specification provides a non-transitory computer-readable medium storing a computer program, wherein execution of the computer program is for: at a mobile automation apparatus comprising: a memory storing a plurality of segments for a plurality of paths through an environment, each of the plurality of segments being fixed in a reference frame, and extending between fixed nodes arranged in a lattice configuration; a navigation module having at least one motor configured to move the mobile automation apparatus in the environment, as navigation occurs a first time along each of respective segments using the navigation module, storing, using the navigation controller, in the memory, control inputs and error signals for the navigation module in association with each of the respective segments; and, as navigation occurs at least a second time along a given segment: generating, using the navigation controller, current control inputs for the given segment based on current error signals and the control inputs and the error signals stored in the memory for the given segment; and storing, using the navigation controller, the current control inputs and the current error signals in the memory in association with the given segment.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of modules 110 of shelves each supporting a plurality of products 112. In the illustrated embodiment, the apparatus 103 is deployed within the retail environment, such as in a store, and at least periodically communicates with the server 101 (via the link 107) as it navigates, autonomously or at least partially autonomously, the length of at least a portion of the shelf modules 110. The apparatus 103 is equipped with a plurality of data capture and/or navigational sensors, such as image sensors (e.g. one or more digital cameras) and depth sensors (e.g. one or more Light Detection And Ranging (lidar) sensors), and is further configured to employ at least some of the sensors to capture shelf data. In the present example, the apparatus 103 is configured to capture a series of digital images of the modules 110, as well as a series of depth measurements, each describing the distance and direction between the apparatus 103 and a point associated with the module 110, such as the shelf module 110 itself or products disposed thereon.

The server 101 includes a controller 120 that is configured to at least periodically communicate with the mobile automation apparatus 103, which navigates the environment and captures data, to obtain the captured data via the communications interface 124 and store the captured data in a repository 132 of the memory 122. The server 101 is specifically configured to perform various post-processing operations on the captured data, and to detect the status of the products 112 on the shelf modules 110. When certain status indicators are detected, the server 101 is also configured to transmit status notifications to the mobile device 105. The controller 120 is interconnected with a non-transitory computer readable storage medium, such as a memory 122. The memory 122 includes a suitable combination of volatile (e.g. Random Access Memory or RAM) and non-volatile memory (e.g. read only memory or ROM, Electrically Erasable Programmable Read Only Memory or EEPROM, flash memory). The controller 120 and the memory 122 each comprise one or more integrated circuits. The controller 120, for example, includes a special purpose controller specifically designed to manage the mobile automation apparatus 103 and having one or more of central processing units (CPUs) and graphics processing units (GPUs) and/or one or more of field-programmable gate arrays (FPGAs) and/or application-specific integrated circuits (ASICs). In an embodiment, a specially designed integrated circuit, such as a Field Programmable Gate Array (FPGA), is designed to perform the navigational and/or image processing functionality discussed herein, either alternatively or in addition to the controller 120 and memory 122. As further discussed below, the mobile automation apparatus 103 also includes one or more controllers or processors and/or FPGAs 320 (FIG. 3), in communication with the controller 120, specifically designed and configured to control navigational and/or data capture aspects of the apparatus 103. As those of skill in the art will realize, in various embodiments, the controller 320 of the mobile automation apparatus 103 performs some or all of the functionality described herein with respect to the controller 120 of the server 101 and vice versa.

The server 101 also includes a communications interface 124 interconnected with the controller 120. The communications interface 124 includes suitable hardware (e.g. transmitters, receivers, network interface controllers and the like) allowing the server 101 to communicate with a plurality of computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the controller 120. The execution of the above-mentioned instructions by the controller 120 configures the server 101 to perform various actions discussed herein. The applications stored in the memory 122 include a control application 128, which may also be implemented as a suite of logically distinct applications. In general, via execution of the control application 128 or subcomponents thereof, the controller 120 is configured to implement various functionality. The controller 120, as configured via the execution of the control application 128, is also referred to herein as the controller 120. As will now be apparent, some or all of the functionality implemented by the controller 120 described below may alternatively or in addition be performed by preconfigured special purpose hardware elements, such as one or more FPGAs or Application-Specific Integrated Circuits (ASICs).

For example, in some embodiments, the server 101 is configured via the execution of the control application 128 by the controller 120, to process image and depth data captured by the apparatus 103 to identify portions of the captured data depicting a back of a shelf module 110, and to detect gaps between the products 112 based on those identified portions. In some embodiments navigation of the mobile automation apparatus 103 is fully autonomous, while in other embodiments the server 101 facilitates navigation of the mobile automation apparatus 103 by providing a map and/or paths and/or path segments and/or navigation data and/or navigation instructions to the apparatus 103 to help the apparatus 103 navigate among the modules 110.

Figure 2:
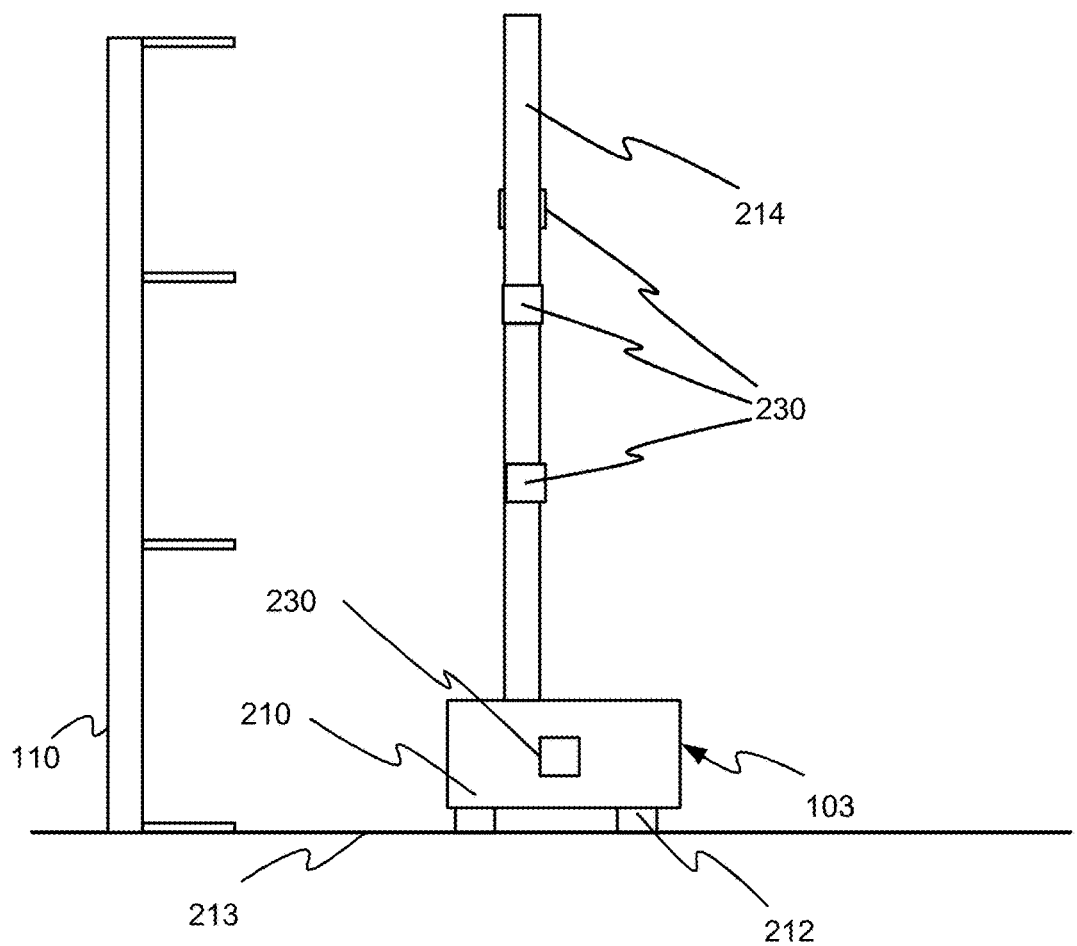
FIG. 2 is a side view of a mobile automation apparatus in accordance with some embodiments.
Figure 3:
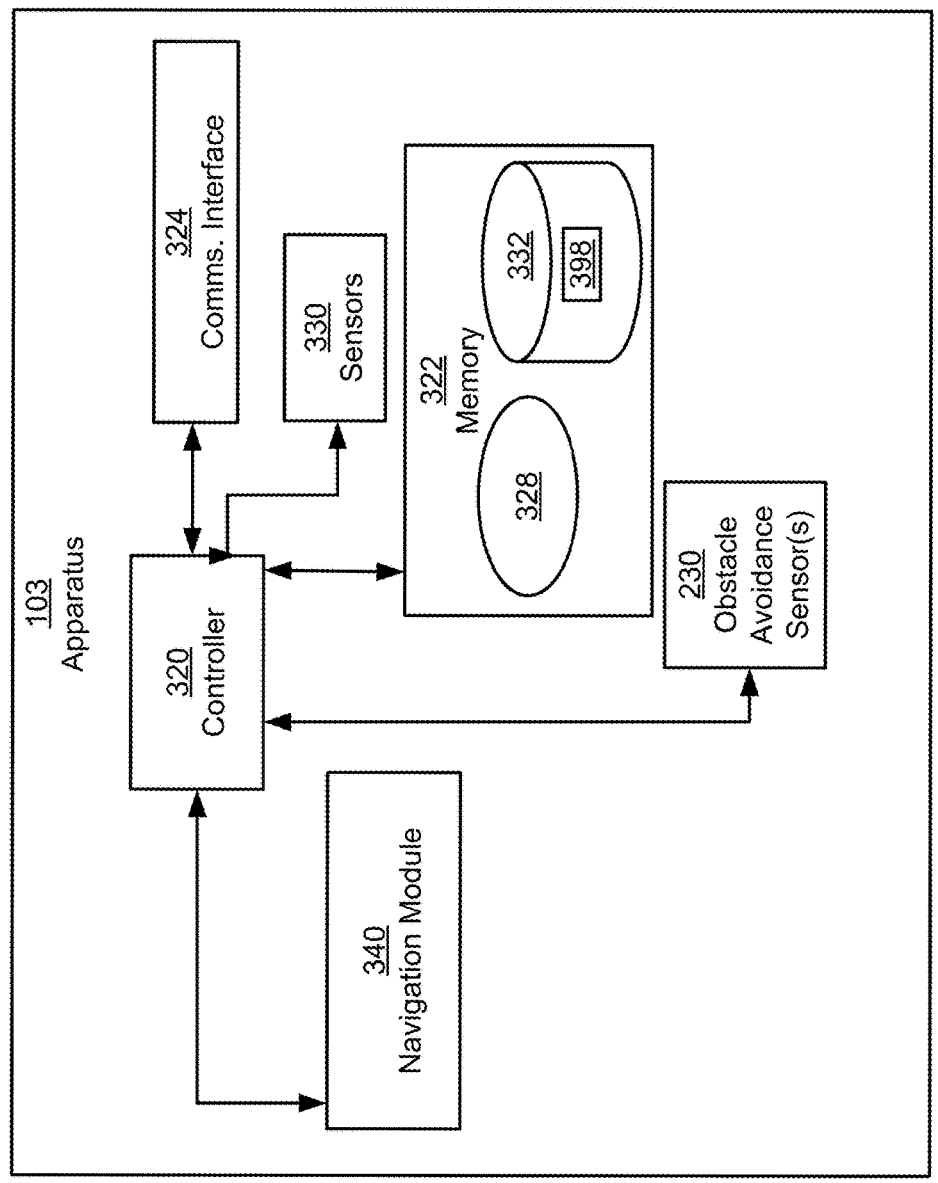
FIG. 3 is a block diagram of the mobile automation apparatus of FIG. 2 in accordance with some embodiments.

Attention is next directed to FIG. 2 and FIG. 3 which respectively depict: a schematic side perspective view of the apparatus 103; and a schematic block diagram of the apparatus 103.

With reference to FIG. 2, the apparatus 103 is being operated adjacent at least one of the modules 110. The apparatus 103 generally comprises: a base 210 configured to move on wheels 212 (e.g. on a floor 213 of the environment), and the like; and a mast 214 and/or support structure extending in an upward direction (e.g. vertically) from the base 210. However, in other embodiments, the base 210 moves on devices other than wheels, for example casters, tracks and the like. In yet further implementations, the mast 214 and the base 210 form a housing. In yet further implementations, a housing of the apparatus 103 has a shape different than the depicted mast/base arrangement.

The apparatus 103 further includes one or more obstacle avoidance sensors 230 configured to detect obstacles in the environment, for example as the apparatus 103 is navigating through the environment. The one or more obstacle avoidance sensors 230 is also configured to assist the apparatus 103 with navigating the environment, for example by acquiring respective data used by the apparatus 103 to navigate a path through the environment. The one or more obstacle avoidance sensors 230 comprises one or more of: image devices (including image sensors, depth cameras, structured light cameras, time-of-flight cameras), LiDAR (Light Detection and Ranging) sensors, ultrasound sensors, and the like, arranged at various positions on the base 210 and the mast 214 in positions to detect obstacles at various heights and directions from the apparatus 103. In general, the one or more obstacle avoidance sensors 230 detect obstacles around the apparatus 103 and provide data regarding the location of the obstacles to a controller 320 (FIG. 3) of the apparatus 103; the controller 320 then navigates to avoid the obstacles.

While not depicted, the base 210 and the mast 214 are provisioned with other various navigation sensors for navigating in the environment in which the modules 110 are located and/or one or more data acquisition sensors for capturing data associated with products, labels and the like on shelves of the modules 110.

Referring now to FIG. 3, a schematic block diagram of further components of the apparatus 103 is depicted. In particular, the apparatus 103 includes a navigation and data capture controller 320, interconnected with a non-transitory computer readable storage medium, such as a memory 322. The memory 322 includes a suitable combination of volatile (e.g. Random Access Memory or RAM) and non-volatile memory (e.g. read only memory or ROM, Electrically Erasable Programmable Read Only Memory or EEPROM, flash memory). In general, the controller 320 and the memory 322 each comprise one or more integrated circuits. The controller 320, for example, includes a suitable combination of central processing units (CPUs), graphics processing units (GPUs), field-programmable gate arrays (FPGAs), and/or application-specific integrated circuits (ASICs) configured to implement the specific functionality of the apparatus 103. Further, as depicted, the memory 322 includes a repository 332 for storing data, for example data collected by sensor(s) 230 and/or sensors 330.

The apparatus 103 also includes a communications interface 324 interconnected with the controller 320. The communications interface 324 includes suitable hardware (e.g. transmitters, receivers, network interface controllers and the like) allowing the apparatus 103 to communicate with other devices—particularly the server 101 and, optionally, the mobile device 105—for example via the links 107, and the like. The specific components of the communications interface 324 are selected based on the type of network or other links over which the apparatus 103 is required to communicate, including, but not limited to, the wireless local-area network of the retail environment of the system 100.

The memory 322 stores a plurality of applications, each including a plurality of computer readable instructions executable by the controller 320. The execution of the above-mentioned instructions by the controller 320 configures the apparatus 103 to perform various actions discussed herein. The applications stored in the memory 322 include a control application 328, which may also be implemented as a suite of logically distinct applications. In general, via execution of the control application 328 or subcomponents thereof, the controller 320 is configured to implement various functionality. As will now be apparent, some or all of the functionality implemented by the controller 320 described below may also be performed by specifically preconfigured hardware elements (e.g. one or more ASICs) rather than by execution of the control application 328 by the controller 320.

As depicted, the memory 322 stores data 398 comprising: a plurality of segments for a plurality of paths through the environment, each of the plurality of segments being fixed in a reference frame, the plurality of segments arranged in a lattice, with adjacent segments defining fixed nodes in the lattice. In some implementations, the data 398 is at least partially generated by the controller 320 as the apparatus 103 is navigating the environment. In other implementations, the data 398 is at least partially generated by the controller 320 as the apparatus 103 is navigating the environment in a mapping mode that collects and stores navigational data describing the environment (e.g., shelf module and permanent obstacle locations) for future navigation sessions. In yet further implementations, the data 398 is at least partially provisioned at the memory 322, for example by server 101 using the links 107, presuming the server 101 is configured to generate the data 398 based on geographic information about the environment (e.g. locations and physical configuration of the modules 110 in the environment); in some of these implementations, the geographic information about the environment is at least partially acquired by the apparatus 103 (e.g. in a mapping mode and/or while navigating the environment) and transmitted to the server 101. Regardless, the data 398 generally defines a map of the environment and/or paths through the environment along which the apparatus 103 may navigate. As depicted, the data 398 is stored in the repository 332, however the data 398 is alternatively stored outside of the repository 332 and/or in association with the application 328.

The controller 320 is in further communication with the one or more obstacle avoidance sensors 230, and with further navigation and/or data acquisition sensors 330, including, but not limited to, LiDAR (Light Detection and Ranging) sensors, structured light cameras, proprioceptive sensors, as well as other navigation sensors and/or data acquisition sensors.

The apparatus 103 further includes a navigation module 340 configured to move the apparatus 103 in an environment, for example the environment of the modules 110, as based on the data 398. The navigation module 340 comprises any suitable combination of motors, electric motors, stepper motors, and the like configured to drive and/or steer the wheels 212, and the like, of the apparatus 103.

In particular, the navigation module 340 is controlled according to control inputs and further generates error signals and/or causes error signals to be generated. Such control inputs include data which cause the navigation module 340 to move between positions on a path in the environment, for example data which controls the wheels 212 to steer, brake, move forward, move backward, and the like, including, but not limited to data to control each of the wheels 212 in a differential manner (e.g. each of the wheels 212 can be controlled according to different control inputs).

Error signals are generated at least when the navigation module 340 implements the navigation and/or control of the wheels 212. However, error signals may be generated regardless of whether the navigation module 340 is implementing navigation; indeed, the error signals are generated while the apparatus 103 is operational. In some implementation, such error signals generally comprise data indicative of a navigation error and the like and hence can be alternatively referred to as error data. Regardless, the error signals are storable as data at the memory 122, 322. The error signals include, but are not limited to, one or more of: error signals from navigation sensors, and the like, indicating whether the apparatus 103 is deviating from a path; error signals from proprioceptive sensors that monitor, for example, slippage by the wheels; error signals from the navigation module 340 that indicate issues in implementing the control inputs; errors signals indicating whether the apparatus 103 is violating any navigation constraints, for example being outside an imaging range, violating an angle constraint and the like. Violating an angle constraint includes determining that the apparatus 103 is at an angle to a module 110 where high-quality images cannot be acquired (e.g. images where labels and the like on the shelves of the modules 110 cannot be imaged adequately for computer vision algorithms to extract data therefrom). Other types of error signals will occur to those skilled in the art including, but not limited to, error data that includes an obstacle indication associated with a given path segment, wheel slippage events, angle constraint violations, as well as navigation instructions and/or actual navigation positions that resulted in violations of positional constraints.

Hence, in general, the controller 320 is configured to control the navigation module 340 to navigate the environment of the module 110 using data from the one or more obstacle avoidance sensors 230 and/or navigation sensors and/or other sensors.

While not depicted, the apparatus 103 is generally powered by a battery.

In the present example, the apparatus 103 is configured via the execution of the control application 328 by the controller 320, to control navigation module 340 to navigate the environment and avoid obstacles using fixed segmented lattice planning as described hereafter.

Figure 4:
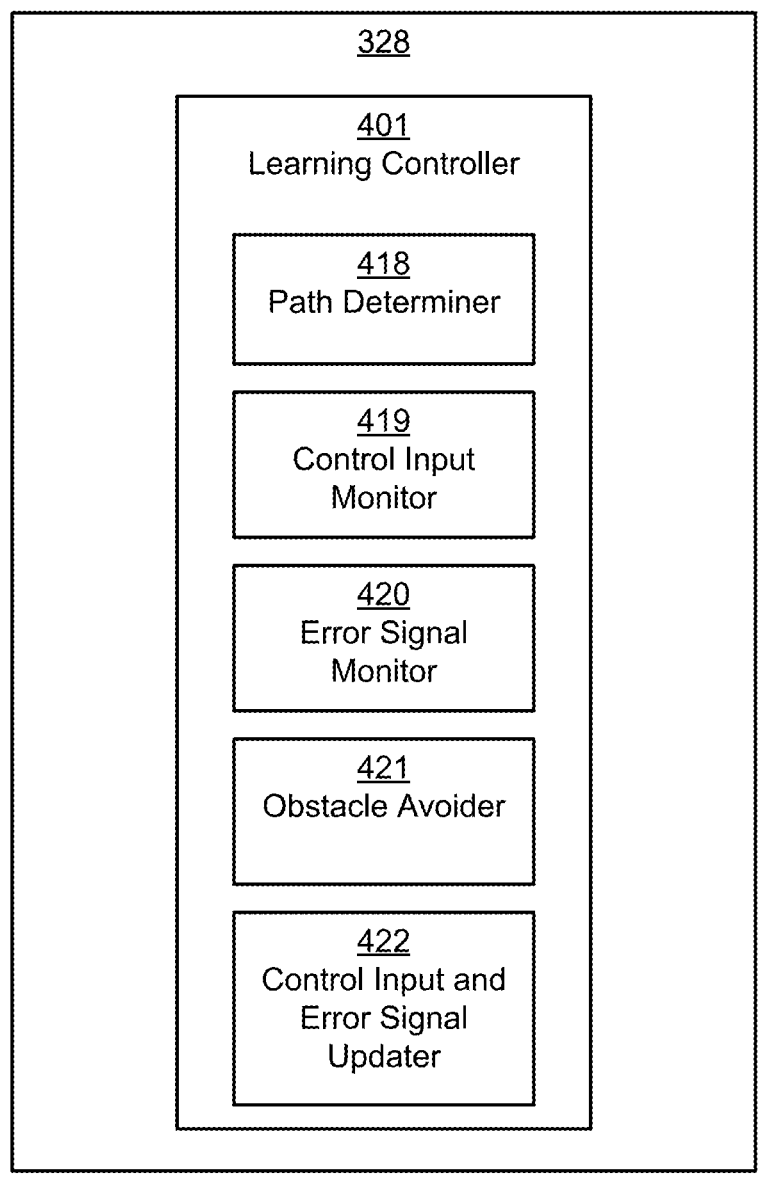
FIG. 4 is a block diagram of a control application in accordance with some embodiments.

Turning now to FIG. 4, before describing the operation of the application 328 to control the navigation module 340, certain components of the application 328 will be described in greater detail. As will be apparent to those skilled in the art, in other examples the components of the application 328 may be separated into distinct applications, or combined into other sets of components. Alternatively, or in addition, to improve navigation processing reliability and speed, at least some of the components of FIG. 4 are programmed directly into the navigation and data capture controller 320, which may be an FPGA or an ASIC having circuit and memory configuration specifically designed to optimize navigation path processing and capture of high volume of associated sensor data. In such an embodiment, some or all of the control application 328, discussed below, is an FPGA or an ASIC chip.

The control application 328 includes a learning controller 401. In brief, the learning controller 401 is configured to navigate the apparatus 103 along a path to a destination location while avoiding obstacles while learning how to best navigate the apparatus 103 along segments of the path. In some implementations, navigation occurs while the apparatus 103 is capturing and/or acquiring data associated with products, labels and the like on shelves of the modules 110 using the data acquisition sensors. As the data acquisition sensors can require tight operational data acquisition constraints (e.g. so that products, labels and the like on shelves of the modules 110 are within a depth of field of the data acquisition sensors, such as cameras, and the like), the learning controller 401 performs the navigation within pre-determined operational constraints, as described below. However, techniques described herein are not dependent on the apparatus 103 capturing and/or acquiring data.

The learning controller 401 includes a path determiner component 418 configured to determine a path through the environment based, for example, on a destination location (e.g. received from the server 101 using the links 107) and the data 398, where the navigation occurs on a segment-by-segment basis as described below.

The learning controller 401 further includes a control input monitor 419 configured to monitor and store control input to the navigation module 340 while the apparatus 103 is navigating a path through the environment. The control input to the navigation module 340 is stored in data 398 in association with respective segments at which the control input was acquired.

The learning controller 401 further includes an error signal monitor component 420 configured to monitor and store error signals (e.g. error data) caused by the navigation module 340 navigating the apparatus 103 along a path through the environment. The error signals (and/or associated error data) are stored in data 398 in association with respective segments at which the error signals were acquired.

The learning controller 401 further includes an obstacle avoider component 421 configured to avoid obstacles while the apparatus 103 is navigating a path through the environment, for example based on data received from the one or more obstacle avoidance sensors 230; the obstacle avoider 421 one or more of: utilizes alternative existing paths through the environment to avoid the obstacles; and generates new paths through the environment to avoid the obstacles.

The learning controller 401 further includes a control input and error signal updater component 422 configured to update the control inputs and the error signals stored in memory 322 based, at least in part, on current control inputs and current error signals while the apparatus 103 is navigating a path through the environment. For example, the control input and error signal updater 422 generates current control inputs for a given segment based on current error signals and the control inputs, as well as past error signals stored in the memory 322 for the given segment; and stores the current control inputs and the current error signals in the memory 322 in association with the given segment. Furthermore, error signals for more than one previous navigation event for a given segment may be stored in the memory 322, and current control inputs may be generated on a weighted average, and the like of two or more previous set of error signals, with a higher weight being assigned to the most recent error signals.

Hence, the controller 32 is generally configured to: determine control inputs and error signals for the navigation module 340 using the learning controller 401; and update the control inputs and the error signals, based at least in part on the current control inputs and the resultant error signals, as well as past error signals, using the learning controller 401.

Figure 5:
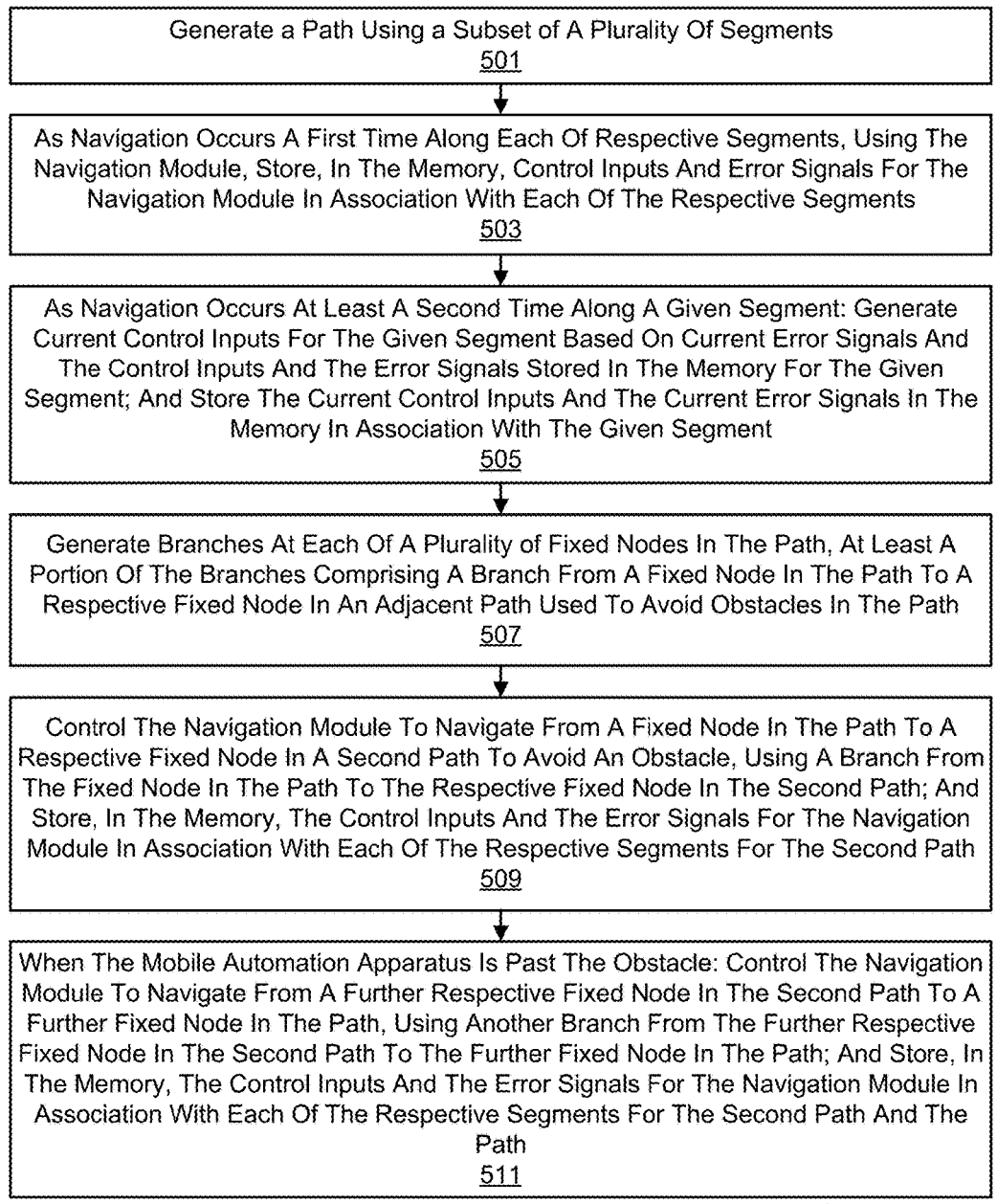
FIG. 5 is a flowchart of a method for navigating a mobile automation apparatus using a fixed segmented lattice planning in accordance with some embodiments.

Attention is now directed to FIG. 5 which depicts a flowchart representative of an example method 500 of navigation of a mobile automation apparatus using fixed segmented lattice planning. The example operations of the method 500 of FIG. 5 correspond to machine readable instructions that are executed by, for example, the apparatus 103, and specifically by the controller 320 and/or the various components of the control application 328 including, but not limited to, the learning controller 401. Indeed, the example method 500 of FIG. 5 is one way in which the apparatus 103 is configured. However, the following discussion of the example method 500 of FIG. 5 will lead to a further understanding of the apparatus 103, and its various components. However, it is to be understood that in other embodiments, the apparatus 103 and/or the method 500 are varied, and hence need not work exactly as discussed herein in conjunction with each other, and that such variations are within the scope of present embodiments.

Furthermore, the example method 500 of FIG. 5 need not be performed in the exact sequence as shown and likewise, in other embodiments, various blocks may be performed in parallel rather than in sequence. Accordingly, the elements of method 500 are referred to herein as "blocks" rather than "steps." The example method 500 of FIG. 5 may be implemented on variations of the example apparatus 103, as well.

At block 501, the controller 320 generates a path using a subset of the plurality of segments stored in the data 398. For example, the block 501 occurs using the path determiner 418. The block 501 occurs, in some implementations, when a destination is received from the server 101, the path that is generated being to the destination location. Alternatively, the block 501 is generated, not to a destination location, but past given modules 110 in the environment, the path including, but not limited to, a closed loop path (e.g. a path which loops back around on itself).

At block 503, as navigation occurs a first time along each of respective segments, using the navigation module 340, the controller 320 stores, in the memory 322, control inputs and error signals for the navigation module 340 in association with each of the respective segments. For example, the block 503 occurs using the control input monitor 419 and the error signal monitor 420.

At block 505, as navigation occurs at least a second time along a given segment the controller 320: generates current control inputs for the given segment based on current error signals and the control inputs and the error signals stored in the memory 322 for the given segment; and stores the current control inputs and the current error signals in the memory 322 in association with the given segment. For example, the block 505 occurs using the control input and error signal updater 422.

At block 507, the controller 320 generates branches at each of a plurality of fixed nodes in the path, at least a portion of the branches comprising a branch from a fixed node in the path to a respective fixed node in an adjacent path used to avoid obstacles in the path. For example, the block 507 occurs using the path determiner 418. The block 507 occurs, in some implementations, when the path is generated, for example in conjunction with the block 503.

At block 509, as navigation occurs along the path using the control inputs and the error signals stored in the memory 322 in association with each of the respective segments of the first path, and when an obstacle is detected in the path, using the one or more obstacle avoidance sensors 230, the controller 320: controls the navigation module 340 to navigate from a fixed node in the path to a respective fixed node in a second path to avoid the obstacle, using a branch from the fixed node in the path to the respective fixed node in the second path. For example, the second path can be an adjacent path, a parallel path, a path within a constraint boundary, and the like. Indeed, navigation around an obstacle using a second path (as well as generation of the second path) is explained in further detail below with respect to FIG. 9 and FIG. 10. However, the second path generally comprises any path that comprises the segments stored in the memory 322.

Also at the block 509 the controller 320 stores, in the memory 322 (e.g. in the data 398), the control inputs and the error signals for the navigation module 340 in association with each of the respective segments for the second path. For example, the block 509 occurs using the control input monitor 419, the error signal monitor 420, the obstacle avoider 421 and, the control input and error signal updater 422.

At block 511, when the one or more obstacle avoidance sensors 230 indicate that the mobile automation apparatus 103 is past the obstacle, the controller 320: controls the navigation module 340 to navigate from a further respective fixed node in the second path to a further fixed node in the path, using another branch from the further respective fixed node in the second path to the further fixed node in the path; and stores, in the memory 322 (e.g. in the data 398), the control inputs and the error signals for the navigation module in association with each of the respective segments for the second path and the path. For example, as will be explained below with reference to FIG. 10, when an obstacle is encountered along a path, for example an optimal path, the apparatus 103 navigates to a second path to avoid the obstacle and, when past the obstacle, the apparatus 103 navigates back to the optimal path. In each instance, as the apparatus 103 navigates between the paths, navigation occurs along segments that extend between fixed nodes in each path. Indeed, in general, in the present specification, the apparatus 103 is navigating from fixed node to fixed node in the lattice configuration, and/or along segments between the fixed nodes The method 500 is next described with reference to FIG. 6 to FIG. 10, each of which are substantially similar with like elements having like numbers.

Figure 6:
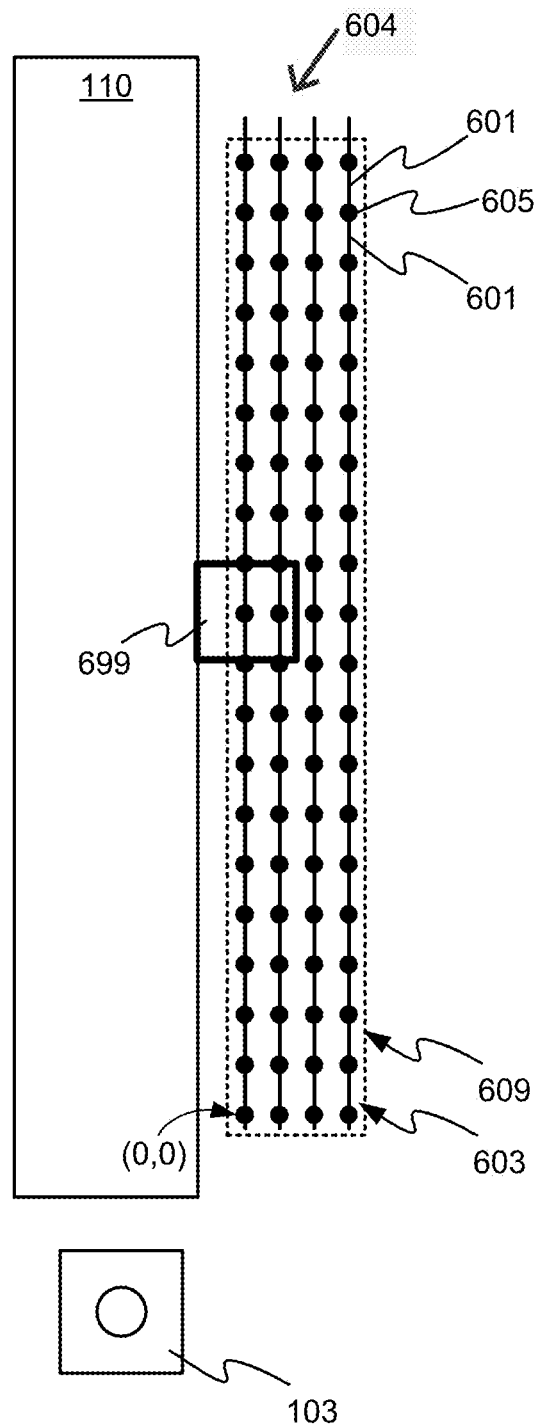
FIG. 6 is a top view of the mobile automation apparatus of FIG. 2 in an environment, along with a depiction of fixed segments and fixed nodes used for navigation in accordance with some embodiments.

In particular, FIG. 6 depicts a top view of the apparatus 103 and a module 110 as well as a plurality of segments 601 that can be used to navigate through the environment of the modules 110 for example by forming a path 603 from the segments 601. As depicted, four example parallel paths 603 have been formed from the segments 601. For example, the path 603 closest to the module 110 can comprise an optimal path of the apparatus 103 for acquiring images of products, and the like, on the shelves of the module 110 at a given distance, while the remaining paths 603 are alternate paths that the apparatus 103 can use to avoid obstacles, as described in more detail below.

Adjacent segments 601 are joined by fixed nodes 605. While the depicted example fixed nodes 605 are shown as joining adjacent segments on each of the example paths 603, the fixed nodes 605 can join other segments 601, for example segments 601 on adjacent paths 603. Put another way, each of the segments 601 in FIG. 6, and as described elsewhere in the present specification, extend between fixed nodes 605.

Furthermore, the segments 601 and the fixed nodes 605 of the plurality of paths 603 are arranged in a lattice configuration 604. The lattice configuration 604 generally comprises the fixed nodes 605 arranged in a periodic pattern in at least two orthogonal directions (e.g., along module 110 and perpendicular to the module 110 as shown in FIG. 6) according to a given resolution that sets a predetermined distance or segment length between adjacent nodes 605 along the path and/or among adjacent paths. For example, as shown in FIG. 6, the fixed nodes 605 are arranged in a grid pattern, such that the fixed nodes 605 are arranged periodically in two orthogonal directions. Furthermore, while the resolution of the lattice configuration 604 is the same for all the depicted fixed nodes 605, the resolution of the lattice configuration can be different for other regions and corresponding path segments of the environment (e.g., based on control input modification). Additionally, as those of skill in the art will realize, other periodic configuration patterns or grids of nodes 605 and segments 601, for example a hexagonal pattern of nodes and segments, are within the scope of embodiments of the present disclosure.

The resolution is generally dependent on operational constraints of the apparatus 103; for example, when the apparatus 103 is to navigate according to a given minimum speed, and/or within the constraint box 609, and/or at given angles to the module 110, and the like, the fixed nodes 605 in the lattice configuration are selected to be at a resolution that enables the apparatus 103 to maintain the speed and the positional constraints and/or the angular constraints such that, at least during obstacle avoidance the apparatus 103 operates within the constraints. Furthermore in regions where the apparatus 103 is more likely to encounter obstacles, the resolution can be higher than in other regions.

For example, the lattice configuration can have a first resolution in a first region of the environment and a second resolution in a second region of the environment. In such examples, the lattice configuration can have a first resolution (e.g. fixed nodes 605 per linear distance in two directions) in a region of the environment adjacent to the module 110 and/or within a constraint box 609 (described in further detail below) and/or in a region where data associated with the modules 110 is being acquired (e.g. images of products on shelves of the modules 110, and the like). The lattice configuration can have a second resolution in a region of the environment not adjacent to the module 110 and/or outside of the constraint box 609 and/or in a region where data associated with the modules 110 is not being acquired.

Furthermore, in some implementations, wherein a resolution of the lattice configuration is dynamic, the controller 320 is further configured to: change a resolution of the lattice configuration in a region to an updated resolution, and generate new control inputs and determine associated new error signals for each of updated segments in the lattice configuration at the updated resolution. In other words, method 500 is repeated for new segments and/or fixed nodes when the lattice configuration resolution is changed, though the data associated with segments and/or fixed nodes in the previous resolution may continue to be stored in the event that the resolution of the lattice configuration changes back to the previous resolution.

Furthermore, positions of the segments 601 and the fixed nodes 605 are further fixed in a reference frame, for example a local coordinate reference frame, local to the environment of the modules 110 and/or local to one of the modules 110. As depicted, the reference frame has an origin coordinate (0,0) at one of the fixed nodes 605. In some implementations, the origin coordinate (and/or another location in the environment) coincides with a location in a global reference frame (e.g. as determined using a Global Positioning System device), and the apparatus 103 can be localized in the local reference and/or the global reference frame.

In general, the positions of the segments 601 and the fixed nodes 605 are defined by the data 398. While positions of the segments 601 and the fixed nodes 605 are depicted in FIG. 6, segments 601 and the fixed nodes 605 are not physically marked in the environment of the modules 110 (i.e., there are no painted lines and the like). Instead, the coordinates corresponding to the positions of each of the segments 601 (e.g., positions of two fixed nodes 605 between which any given segment 601 extends), as well as coordinates corresponding to the positions of each of the fixed nodes 605 within the local coordinate reference frame are stored in the data 398 and used by the apparatus 103 for navigation.

FIG. 6 further depicts a "constraint box" 609 within which the segments 601 and the fixed nodes 605 are located. The constraint box 609 represents a region adjacent the module 110, within which the apparatus 103 is to navigate to meet target data acquisition parameters, for example a range of lateral distances from the module 110 where apparatus 103 is to navigate to enable the data acquisition sensors of the apparatus 103 to reliably acquire data. For example, within the constraint box 609, the data acquisition sensors of the apparatus 103 reliably acquire images, and the like, of the shelves of the module 110 and/or products and/or labels on the shelves. However, outside of the constraint box 609, the data acquisition sensors of the apparatus 103 may not reliably acquire images, and the like, of the shelves of the module 110 and/or products and/or labels on the shelves. When the paths 603 are generated, each of the paths 603 are located inside the constraint box 609; hence, the constraint box 609 can be a given input used to determine the paths 603 to ensure that along all the paths 603 the apparatus 103 can acquire images of products and the like on the shelves of the module 110.

FIG. 6 further depicts an obstacle 699 for at least one of the paths 603. The obstacle 699 includes, but is not limited to, displays (e.g. a retail display), pallets, shopping carts, people, and/or any object which the apparatus 103 could collide with when navigating adjacent the module 110 within the constraint box 609.

However, initially, the apparatus 103 has not detected the obstacle 699 and a path through the constraint box 609 is generated without reference to a position of the obstacle 699.

Figure 7:
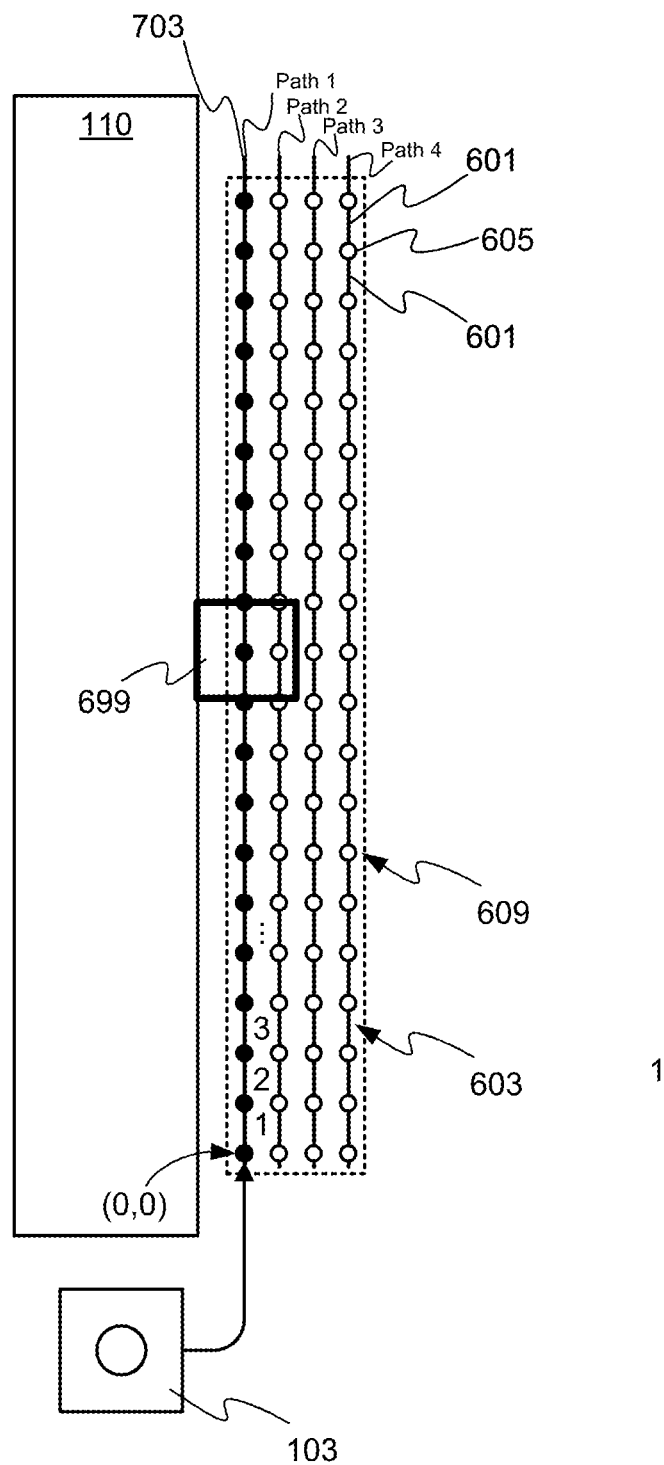
FIG. 7 depicts initial path generation using a subset of the fixed segments of FIG. 6 in accordance with some embodiments.

For example, with reference to FIG. 7, which depicts a non-limiting implementation of the block 501 of the method 500, a path 703 (e.g. one of the paths 603) is generated, for example by the controller 320, using a subset of the plurality of segments 601. The path 703 represents, in some implementations, an optimal path for acquiring images, and the like, of the module 110 using the data acquisition sensors.

In FIG. 7, The segments 601 of the path 703 are distinguished from the other segments 601 by the associated fixed nodes 605 being black, while the other fixed nodes 605 are white. The path 703 is generated, for example, when the apparatus 103 receives a destination location, and the like, for example from the server 101; in FIG. 7, it is assumed that the destination location results in the controller 320 generating the path 703.

Furthermore, the positions of the segments 601 and the fixed nodes 605 do not change when generating the path 703. In other words, the generated path 703 for navigating past the module 110 is generated from the positions of the segments 601 and the fixed nodes 605; hence, even when a path used to navigate past the module 110 changes, any updated path is generated from the segments 601 and the fixed nodes 605.

Hence, the apparatus 103 attempts to navigate the path 703. However, any actual path navigated by the apparatus 103 can deviate from a generated path, for example when the generated path includes turns, sharp turns, variations in the floor 213 where the generated path is located, and the like.

For each of the segments 601 in the path 703, the controller 320 stores (e.g. at the block 503), in the memory 322, control inputs used to control the navigation module 340 in association with the segments 601, for example in the data 398. Similarly, for each of the segments 601 in the path 703, the controller 120 stores (also at the block 503), in the memory 322, error signals generated as the segments 601 in the path 703 are navigated. The error signals stored in association with the segments 601, for example in the data 398.

Indeed, the control inputs stored in the memory 322 represent a best attempt by the apparatus 103 to navigate each segment 601 of a generated path, with the error signals indicating deviations from the generated path at each segment 601 and/or navigation issues encountered during navigation at each segment 601.

For example, TABLE 1 provides a non-limiting example of the block 503 (e.g. in which as navigation occurs a first time along each of respective segments 601, using the navigation module 340, and the controller 320 stores, in the memory 322, control inputs and error signals for the navigation module 340 in association with each of the respective segments). In particular, with reference to FIG. 7, each of the paths 603 are numbered Path 1 (e.g. path 703), Path 2, Path 3, Path 4, and the first three parallel segments 601 in each of the paths 603 are numbered as 1, 2, 3. As the apparatus 103 navigates path 703 (e.g. Path 1), the control inputs used to navigate the segments 601 are stored in the data 398, along with the resulting error signals.

TABLE 1

| Segment | Path 1 (703) | Path 2 | Path 3 | Path 4 |
|---|---|---|---|---|
| 1 | CI 1-1 | Default | Default | Default |
|   | ES 1-1 | {0} | {0} | {0} |
| 2 | CI 1-2 | Default | Default | Default |
|   | ES 1-2 | {0} | {0} | {0} |
| 3 . . . | CI 1-3 | Default | Default | Default |
|   | ES 1-3 | {0} | {0} | {0} |
| N | CI 1-N | Default | Default | Default |
|   | ES 1-N | {0} | {0} | {0} |

Table 1, hence represents the control inputs ("CI") 1-1, 1-2, 1-3 . . . 1-N stored in the data 398 for each of "N" segments in the path 703 (including the first three segments), along with accompanying error signals ("ES") 1-1, 1-2, 1-3 . . . 1-N. For example, each of the control inputs 1-1, 1-2, 1-3 . . . 1-N comprise the control data, and the like, used by the navigation module 340 to control the wheels 212, and the like, along each of the "N" segments 601 in the path 703. Each of the error signals 1-1, 1-2, 1-3 . . . 1-N comprise the resulting error data, and the like, that resulted when the corresponding the control inputs 1-1, 1-2, 1-3 . . . 1-N were used by the navigation module 340 to control the wheels 212, and the like, along each of the "N" segments 601 in the path 703. An example of error data included in the error signals includes an obstacle indication associated with a given path segment, wheel slippage events, angle constraint violations, as well as navigation instructions and/or actual navigation positions that resulted in constraint box 609 violations. In other words, the actual positions of the apparatus 103 as the apparatus 103 is navigating a segment can be stored as part of the error data.

While not depicted, the TABLE 1 includes, in some implementations, positions of the segments 601 and/or the fixed nodes 605 in the environment; hence, the TABLE 1 represents a subset of the data 398.

As no segments 601 along the other paths have yet been navigated, the control inputs comprise default control inputs ("Default") and errors signals each comprise a null set ({0}). The default control inputs are provided, for example, by a manufacturer of the navigation module 340, and the like, and/or provisioned at a factory or during initial setup in a particular environment.

When the apparatus 103 navigates any segment 601 a second time, the control inputs and error signals stored in the memory 322 for that given segment are used to generate current control inputs, the current control inputs also being based on current error signals. In other words, the controller 320 attempts to improve navigation along the given segment by updating and/or refining the control input previously stored to reduce the error signals against the previously stored error signals when again navigating the given segment. The current control inputs and current error signals are again stored in the memory 322.

Furthermore, in some implementations, error signals and corresponding control inputs for several previous navigations of the given segment are stored and the current control input may further be based on a weighting of two or more stored error signals, including, but not limited to, a weighted average of the error signals, with greater weight being assigned to more recent error signals. In some implementations, the current control input may further be based on a weighted running average of, for example, the last three error signals (and/or another number of past error signals) for the given segment.

As shown in TABLE 2, when the apparatus 103 navigates the path 703 at least a second time, the controller 120 updates (e.g. at the block 505) the control inputs and the error signals stored in the memory 322, in association with each of the respective segments 601, with current control inputs and current error signals, for example to attempt to improve navigation along each of the segments 601.

TABLE 2

| Segment | Path 1 (703) | Path 2 | Path 3 | Path 4 |
|---|---|---|---|---|
| 1 | CI-a 1-1 | CI 2-1 | CI 3-1 | CI 4-1 |
|   | ES-a 1-1 | ES 2-1 | ES 3-1 | ES 4-1 |
| 2 | CI-a 1-2 | CI 2-2 | CI 3-2 | CI 4-2 |
|   | ES-a 1-2 | ES 2-2 | ES 3-2 | ES 4-2 |
| 3 . . . | CI-a 1-3 | CI 2-3 | CI 3-3 | CI 4-3 |
|   | ES-a 1-3 | ES 2-3 | ES 3-3 | ES 4-3 |
| N | CI-a 1-N | CI 2-N | CI 3-N | CI 4-N |
|   | ES-a 1-N | ES 2-N | ES 3-N | ES 4-N |

For example, with reference to TABLE 2, for each of the segments 601 along the path 703 (e.g. Path 1), each of the control inputs and error signals are updated and/or refined as control inputs-a 1-1, 1-2, 1-3 . . . 1-N and error signals-a 1-1, 1-2, 1-3 . . . 1-N. For example, if the error signal 1-1 indicates that the wheels 212 had slippage in the corresponding segment 601, when the control input 1-1 was used by the navigation module 340 to control the wheels 212, the second time the apparatus 103 navigates the same segment 601, the control input 1-1 is updated and/or refined to the control input-a 1-1 which is generated by the controller 320 to reduce and/or eliminate the slippage. The resulting error signal-a 1-1 provides an indication of whether the slippage was reduced and/or eliminated and can further be monitored to further update current control inputs to further reduce and/or eliminate slippage during navigation of the segment.

Furthermore, each of the segments in TABLE 2 for each of the other paths (Path 1, Path 2, Path 3, Path 4) also show respective control inputs and error signals, assuming that those segments have also been navigated at least once. For example, the control inputs ("CI") 2-1, 2-2, 2-3 . . . 2-N and error signals ("ES") 2-1, 2-2, 2-3 . . . 2-N are stored for a first navigation for each segment in Path 2, the control inputs ("CI") 3-1, 3-2, 3-3 . . . 3-N and error signals ("ES") 3-1, 3-2, 3-3 . . . 3-N are stored for a first navigation for each segment in Path 3, and the control inputs ("CI") 4-1, 4-2, 4-3 . . . 4-N and error signals ("ES") 4-1, 4-2, 4-3 . . . 4-N are stored for a first navigation for each segment in Path 4.

In other words, each time the apparatus 103 navigates a given segment 601, the corresponding stored control inputs and error signals, stored in association with the given segment 601, are used to generate current control inputs, along with current error signals, and the current control inputs and current error signals are stored in association with the given segment. In this manner, the apparatus 103 navigates an environment on a segment-by-segment basis and further updates and/or refines navigation through the environment on a segment-by-segment basis.

In the illustrated example, as the path 703 intersects the obstacle 699, as the apparatus 103 navigates along the path 703, the one or more obstacle avoidance sensors 230 detect the obstacle 699.

Figure 8:
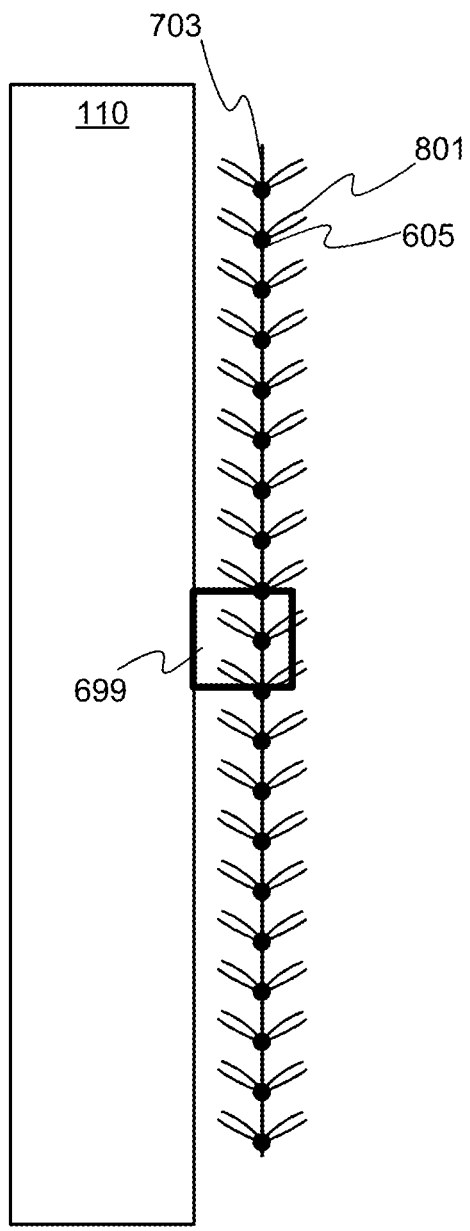
FIG. 8 depicts branch generation along the generated path of FIG. 7 in accordance with some embodiments.

Hence, with reference to FIG. 8, which depicts only path 703 adjacent to the module 110 and the obstacle 699, at the block 507, the controller 320 generates branches 801 at each of the plurality of fixed nodes 605 in the path 703, at least a portion of the branches 801 comprising a branch from a fixed node 605 in the path 703 to a respective fixed node in an adjacent path used to avoid obstacles in the path 703. In some implementations, the branches 801 are generated when the path 703 is generated, in other implementations, the branches 801 are generated when the lattice of segments 601 and/or fixed nodes 605 are generated, while in further implementations, the branches 801 are generated when the obstacle 699 is detected.

Furthermore, the branches 801 are generated at fixed nodes 605 on paths other than the path along which the apparatus 103 is navigating. The branches 801 are generated between fixed nodes 605 according to any suitable technique including, but not limited to, cubic spline techniques, optimal trajectory generators, and the like; such techniques can include, as inputs, operational constraints of the apparatus 103 including, but not limited to, a minimum speed of the apparatus 103, turning constraints, angular constraints, and the like.

Figure 9:
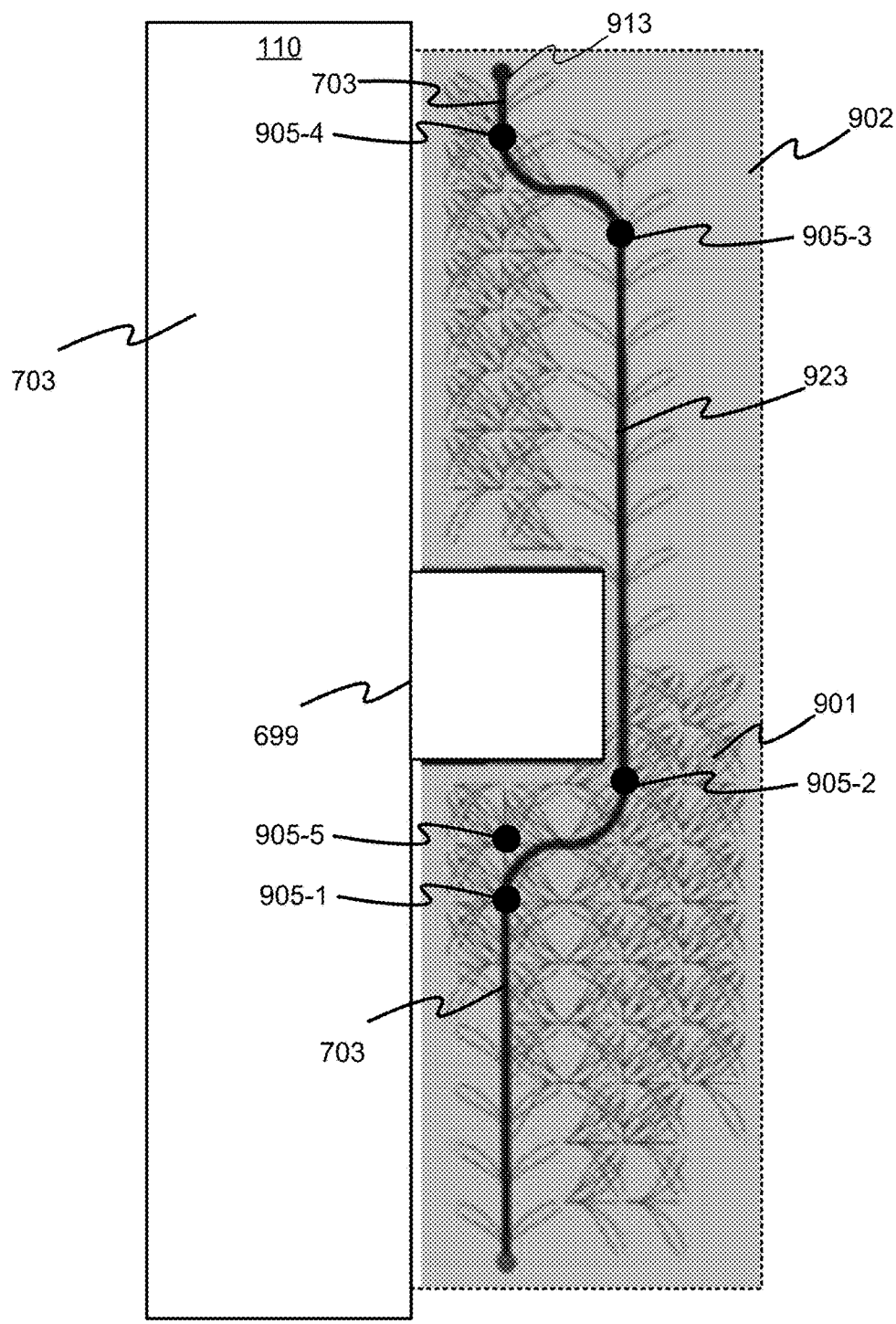
FIG. 9 schematically depicts branch generation at the fixed segments of FIG. 6 in accordance with some embodiments.

For example, attention is next directed to FIG. 9 which depicts schematically branches 901 (e.g. depicted within the area 902) from a plurality of the fixed nodes, represented by fixed nodes 905-1, 905-2, 905-3, 905-4 (referred to hereafter collectively as a fixed node 905). Each of the branches 901 are from a fixed node on a lattice and is a potential alternative path segment available to the apparatus 103.

Furthermore, each of the branches 901 represent a further segment along which the apparatus 103 may navigate, for example to continue on a given path and/or to avoid obstacles, for example a segment between fixed nodes 605 on adjacent paths 603. Such segments represented by the branches 901 are, in some implementations, perpendicular to the paths 603 and/or at an angle to the paths 603, and/or are curved to account for a minimum speed of the apparatus, a turning radius, and the like, of the apparatus 103 at that speed, angular constraints of the apparatus 103 when navigating relative to the module 110, and/or any other operational constraints.

Put another way, a respective set of default control inputs is associated with each branch 901 that define an associated set of control motions executable by the apparatus 103 and/or the navigation module 340.

It is further understood from FIG. 9 that for at least some of the fixed nodes, respective branches 901 extend along a path that the apparatus 103 is already navigating. For example, from the fixed nodes 905-1, a branch 901 extends to the fixed node 905-5. Indeed, for at least some of the fixed nodes, the branches 901 extend (e.g. from a direction of navigation of the apparatus 103 and/or a potential direction of navigation of the apparatus 103) "forward", "backward", "left" and "right", with the branches 901 each defining at least a portion of a segment 601 negotiable by the apparatus 103. In other words, a shape of a branch 901 is generated according to, for example, minimum speed of the apparatus, a turning radius, and the like, of the apparatus 103 at that speed, angular constraints of the apparatus 103 when navigating relative to the module 110, and/or any other operational constraints.

As depicted, the branches 801, 901 are generated when the path 703 is generated, for example for the path 703, as in FIG. 8, as well as for adjacent paths 603, and/or for the fixed nodes 605 and/or the segments 601 that could be included on adjacent paths 603.

Also depicted in FIG. 9 is an updated path 913 around the obstacle 699 which includes portions of the path 703, as well as a portion of another of the paths, for example a second path 923 (e.g. another of the paths 603), as described hereafter.

In particular, at least a portion of the branches 901 comprises a branch from a fixed node in a path to a respective fixed node in an adjacent path used to avoid obstacles in the path.

For example, the branch 901 joining the fixed nodes 905-1, 905-2 is from the fixed node 905-1 in the path 703 to the fixed node 905-2 in the second path 923. Similarly, the branch 901 joining the fixed nodes 905-3, 905-4 is from the fixed node 905-3 in the second path 923 to the fixed node 905-4 in the path 703. Furthermore, each of the branches 901 between the fixed nodes 905 represent an additional segment 601 along which the apparatus 103 navigates and for which the apparatus 103 stores control input and error signals.

In addition, generation of the branches 901 can occur only within the bounds of the constraint box 609; in other words, the branches 901 are generally generated only to fixed nodes that lie within the constraint box 609.

In any event, when the apparatus 103 is navigating the path 703 and the obstacle 699 is detected using the one or more obstacle avoidance sensors 230, the controller 320 (e.g. at the block 509): controls the navigation module 340 to navigate from the fixed node 905-1 in the path 703 to the respective fixed node 905-2 in the second path 923 to avoid the obstacle 699, using a branch 801 from the fixed node 905-1 in the path 703 to the respective fixed node 905-2 in the second path 923.

Similarly, when the one or more obstacle avoidance sensors 230 indicate that the mobile automation apparatus 103 is past the obstacle 699, the controller 320 (e.g. at the block 511): controls the navigation module 340 to navigate from the fixed node 905-3 in the second path 923 to the respective fixed node 905-4 in the second path 703 (e.g. returning to an optimum path), using a branch 801 from the fixed node 905-3 in the second path 923 to the respective fixed node 905-4 in the path 703.

Furthermore, as each branch 801 is generated, each of the branches 801 is associated with a set of respective control inputs used by the navigation module 340 to navigate from a respective fixed node in the path to one or more fixed nodes in adjacent paths.

For example, the set of respective control inputs for each branch 801 includes, but is not limited to, control inputs for turning and/or steering and/or braking the wheels 212 to navigate between the fixed nodes 905 between which a given branch 801 extends, and the like.

Figure 10:
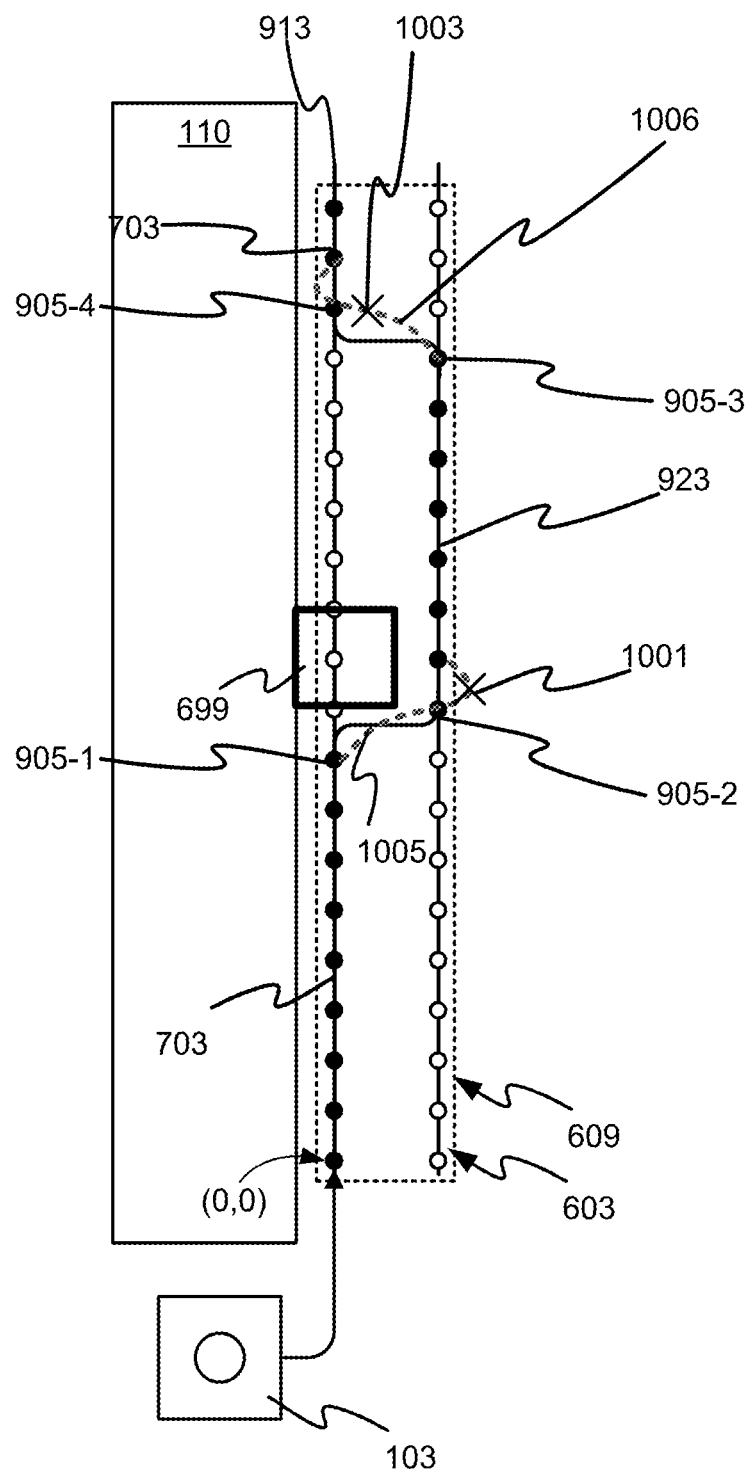
FIG. 10 depicts an updated path and an actual path of the mobile automation apparatus navigating using the fixed segments in accordance with some embodiments.

Attention is next directed to FIG. 10 which depicts the path 913 without depiction of all of the branches 801, as well as the paths 703, 923 whose portions form the path 913. The fixed nodes of each of the paths 703, 923 which form the path 913 are depicted using black circles, while the remaining fixed nodes are depicted using white circles.

As in FIG. 9, the path 913 includes a branch and/or segment between the fixed nodes 905-1, 905-2, and a branch and/or segment between the fixed nodes 905-3, 905-4. However, also depicted in FIG. 10 is an actual path 1005 between the fixed nodes 905-1, 905-2, and an actual path 1006 between the fixed nodes 905-3, 905-4. In other words, the apparatus 103 attempts to navigate (e.g. at the block 509) between the fixed nodes 905-1, 905-2 to avoid the obstacle 699 (e.g. from the path 703 to the second path 923), and when the apparatus 103 is past the obstacle 699, the apparatus 103 attempts to navigate (e.g. at the block 511) between the fixed nodes 905-3, 905-4 (e.g. from the second path 923 back to the path 703).

In other words, the path 1005 represents a best first attempt by the apparatus 103 to navigate the branches and/or the segments between the fixed nodes 905. However, the path 1005 does not exactly follow the branches and/or the segments between the fixed nodes 905. Indeed, at a position 1001, the apparatus 103 is outside of the constraint box 609. Furthermore, at a position 1003, the apparatus 103 violates an angle constraint.

Hence, for each of the corresponding segments of the path 913, the apparatus 103 further stores the control inputs and the error signals in association therewith. For example, for the segments of the path 913 that correspond to the actual path 1005, error signals are stored, the error signals representing one or more of: deviations from the path 913, violations of location constraints (e.g. being outside the constraint box 609, violations of angle constraints, and the like.

Hence, the next time the apparatus 103 navigates the path 913, the apparatus 103 attempts to reduce the error signals and align the actual path 1005 with the path 913, hence refining the control inputs and the error signals.

Put another way, in some implementations the controller 320: determines when one or more constraints for navigating the given segment has been violated; and generate the current control inputs that keep the one or more constraints within respective threshold values, for example for keeping the apparatus 103 within a given threshold distance from a target path, keeping the apparatus 103 within a given threshold angle from the module 110, and the like.

Put yet another way, the controller 320 is configured to cause the apparatus 103 to change from navigating along a first path to navigating along a second path when one or more constraints for navigating the respective segments 601 have been violated, for example by navigating along an updated path (e.g. the second path) that meets the one or more constraints. It is appreciated, however, that the updated path is along existing segments 601 and/or along existing fixed nodes 605.

Furthermore, the next time the apparatus 103 detects the obstacle 699, the apparatus 103 again navigates according to the segments of the path 913 as the branches 901 define the possible segments along which the apparatus 103 can navigate when deviating from the initially generated path 703. However, the apparatus 103 performs navigational learning at each segment 601 and/or branch and/or fixed node 605 in the lattice, using the learning controller 401. Hence, as the apparatus 103 navigates in the environment, the apparatus 103 gradually improves the navigation on a segment-by-segment basis by refining navigation control inputs based on past error signals and/or current error signals.

Indeed, again referring to TABLE 1 and TABLE 2, when the apparatus 103 navigates various segments of Path 1, Path 2, Path 3 and Path 4 at least a second time, the controller 120 updates (e.g. at the block 505) the control inputs and the error signals stored in the memory 322, in association with each of the respective segments 601, with current control inputs and current error signals, for example to attempt to improve navigation along each of the segments 601. For example, in TABLE 3, it assumed that an obstacle was detected in Path 1, and the apparatus 103 navigated to Path 4 to avoid the obstacle, and then back to Path 1.

TABLE 3

| Segment | Path 1 (703) | Path 2 | Path 3 | Path 4 |
|---------|--------------|--------|--------|--------|
| 1 | CI-b 1-1 | CI 2-1 | CI 3-1 | CI 4-1 |
|   | ES-b 1-1 | ES 2-1 | ES 3-1 | ES 4-1 |
| 2 | CI-a 1-2 | CI 2-2 | CI 3-2 | CI-a 4-2 |
|   | ES-a 1-2 | ES 2-2 | ES 3-2 | ES-a 4-2 |
| 3 . . . | CI-a 1-3 | CI 2-3 | CI 3-3 | CI-a 4-3 |
|   | ES-a 1-3 | ES 2-3 | ES 3-3 | ES-a 4-3 |
| N | CI-b 1-N | CI 2-N | CI 3-N | CI 4-N |
|   | ES-b 1-N | ES 2-N | ES 3-N | ES 4-N |

In particular, segment 1 and segment N of Path 1 were navigated three times previously (e.g. two previous times, similar to TABLE 2, and then a third time before and after the obstacle). For example, the letter "b" in the control input CI-b 1-1, and CI-b 1-N (and in the error signals ES-b 1-1, and ES-b 1-N) indicates that the segments were navigated three times.

Similarly, segment 2 and segment 3 of Path 4 were navigated twice (a previous time, similar to TABLE 2, and then a second time as the apparatus 103 navigated to those segments to avoid the obstacle). For example, the letter "a" in the control input CI-a 4-2, and CI-a 4-3 (and in the error signals ES-a 4-2, and ES-a 4-3) indicates that the segments were navigated two times.

While not depicted, TABLE 3 can also store control inputs and error signals for segments and/or branches used to navigate between Path 1 and Path 2.

Figure 11:
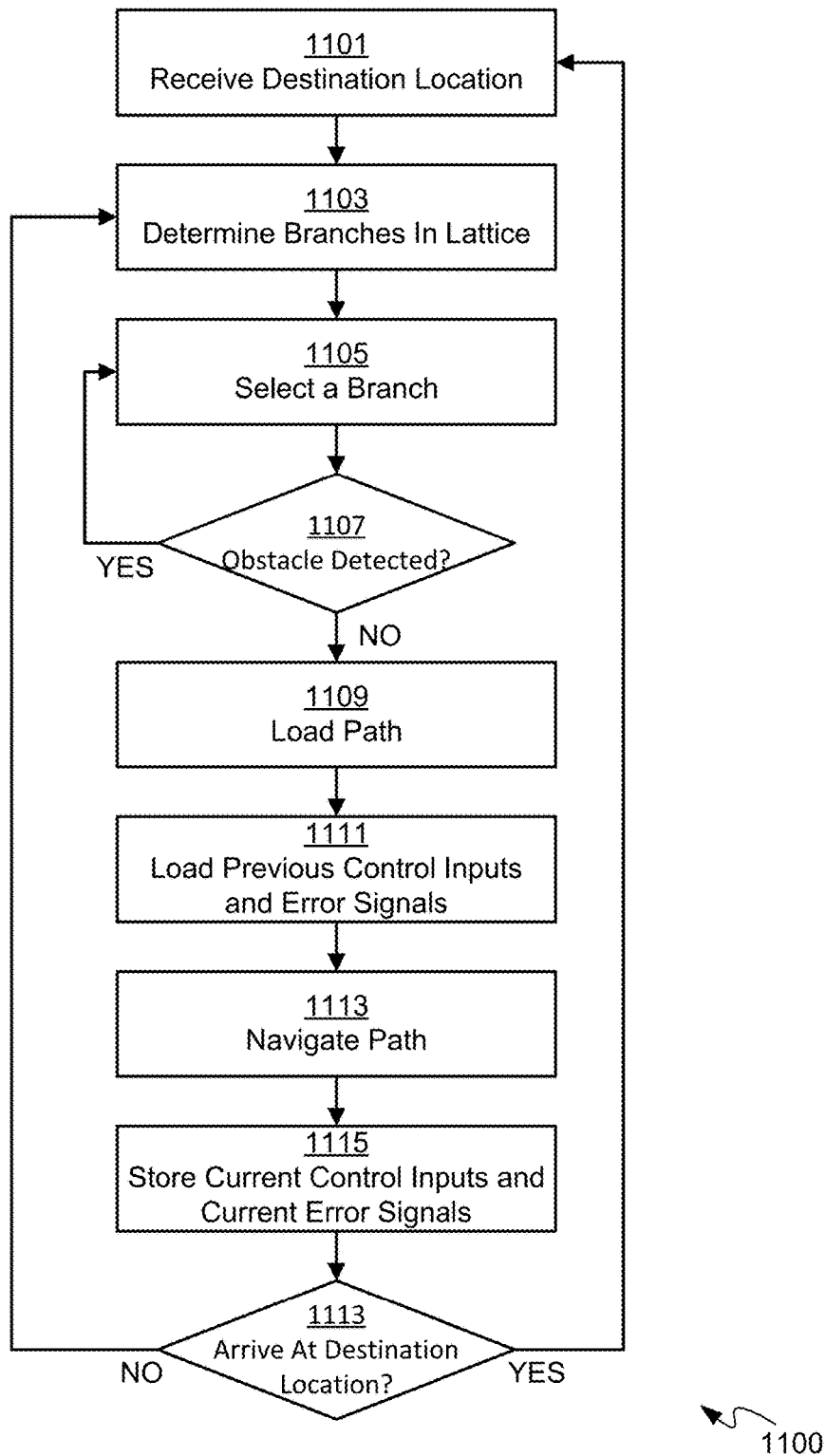
FIG. 11 is a flowchart of a method for navigating a mobile automation apparatus using a fixed segmented lattice planning in accordance with some embodiments.

Attention is now directed to FIG. 11 which depicts a flowchart representative of an example method 1100 of navigation of a mobile automation apparatus using fixed segmented lattice planning. The example operations of the method 1100 of FIG. 11 correspond to machine readable instructions that are executed by, for example, the apparatus 103, and specifically by the controller 320 and/or the various components of the control application 328 including, but not limited to, the learning controller 401. Indeed, the example method 1100 of FIG. 11 is one way in which the apparatus 103 is configured. However, the following discussion of the example method 1100 of FIG. 11 will lead to a further understanding of the apparatus 103, and its various components. However, it is to be understood that in other embodiments, the apparatus 103 and/or the method 1100 are varied, and hence need not work exactly as discussed herein in conjunction with each other, and that such variations are within the scope of present embodiments.

Furthermore, the example method 1100 of FIG. 11 need not be performed in the exact sequence as shown and likewise, in other embodiments, various blocks may be performed in parallel rather than in sequence. Accordingly, the elements of method 1100 are referred to herein as "blocks" rather than "steps." The example method 1100 of FIG. 11 may be implemented on variations of the example apparatus 103, as well.

It is further assumed in the method 1100 that the data 398 has been provisioned at the memory 322 and that the apparatus 103 is at, or adjacent to, one of the fixed nodes 605 defined in the data 398.

At block 1101, the controller 320 receives a destination location, for example from the server 101 and/or mobile device 105.

At block 1103, the controller 320 determines which branches 901 are available to navigate, for example from the given fixed node 605 where the apparatus 103 is currently located. Alternatively, at the block 1103, the controller 320 generates branches using the locations of the fixed nodes 605 stored in the data 398

At block 1105, the controller 320 selects a branch 901 to navigate and, at block 1107, the controller 320 determines whether there is an obstacle in the direction of the selected branch 901 using the one or more obstacle avoidance sensors 230.

If so (e.g. a "YES" decision at the block 1107), the block 1105 is executed again until no obstacle is detected at the block 1107 (e.g. a "NO" decision at the block 1107), when, at block 1109, the controller 320 loads a path to be navigated to the destination location and that includes the selected branch 901 where no obstacle is detected.

At the block 1111, the controller 320 loads previous control inputs and error signals, if any, for navigating segments in the path loaded at the block 1109, and at block 1113, the controller 320 controls the navigation module 340 to navigate the path using the previous control inputs, if any. If there are no previous control inputs, the controller 320 navigates the path at least along a first segment 601 according to navigation sensors and the like and/or using any default control inputs. Regardless, as the path is navigated, the controller 320 monitors the error signals and/or navigates to reduce stored error signals. Hence, as each segment 601 is navigated at least a second time, the apparatus 103 iteratively learns to navigate each segment 601.

At block 1115, the controller 320 stores current control inputs and current error signals for the segment 601 (and/or segments 601) that has been navigated, for example as described above with regards to TABLE 1 and TABLE 2.

The method 1100 repeats from the block 1103 at each of the fixed nodes 605 and/or at every "nth" fixed node, and the like, until the apparatus 103 arrives at the destination location, as determined at the block 1113, where "n" is an integer that is configurable at the apparatus 103. The method 1100 either ends when the destination location is reached, as determined at the block 1113, or repeats when another destination location is received (e.g. at a "NO" decision at the block 1113, block 1103 is re-executed, and at "YES" decision at the block 1113, the method 1100 ends or the block 1101 is re-executed).

Hence, as the blocks 1103 to 1113 of the method 1100 are executable at each of the fixed nodes 605, in some implementations, the apparatus 103 navigates between fixed nodes 605 arranged in a lattice configuration. Furthermore, in some implementations, the control inputs and error signals are stored in association with the fixed nodes and/or respective segments.

The present specification is directed to fixed segmented lattice planning for a mobile automation apparatus and, for example, iterative learning of paths through an environment on a segment-by-segment basis, the segments and fixed nodes associated with segments being fixed in location in a reference frame and arranged in a lattice configuration. Further, as the mobile automation apparatus navigates using different segments to avoid obstacles, control inputs are "learned" and/or refined and/or updated for each segment in the lattice that is navigated. Indeed, at each fixed node in the lattice, the mobile automation apparatus can execute any of a plurality of a respective set control motions represented by branches from each of the fixed nodes, which will cause the mobile automation apparatus to navigate to a next fixed node in the lattice. Each fixed node and its associated branches are generally fixed in a static reference frame, which can be local or global. Furthermore, for every branch of every lattice, the control inputs and error signals are stored and then retrieved a next time the mobile automation apparatus uses a branch, and which are used to improve path tracking. Furthermore, as the environment changes, the apparatus 103 adapts to the environment through continued obstacle detection, and refining of the control inputs and error signals for any segments used to avoid the obstacles. Environmental changes can also result in the apparatus 103 determining an updated optimal path through the environment, along with the segment-by-segment learning techniques described herein also occur.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A mobile automation apparatus comprising:
   a memory storing a plurality of segments for a plurality of paths through an environment, each of the plurality of segments being fixed in a reference frame and extending between fixed nodes arranged in a lattice configuration;
   a navigation module having at least one motor configured to move the mobile automation apparatus in the environment; and
   a navigation controller configured to:
      as navigation occurs a first time along each of respective segments using the navigation module, store, in the memory, control inputs and error signals for the navigation module in association with each of the respective segments;
      as navigation occurs at least a second time along a given segment: generate current control inputs for the given segment based on current error signals and the control inputs and the error signals stored in the memory for the given segment; and store the current control inputs and the current error signals in the memory in association with the given segment,
      wherein the controller is further configured to generate branches at each fixed node in a path, each of the branches associated with a set of respective control inputs used by the navigation module to navigate from a respective fixed node in the path to one or more fixed nodes in adjacent paths.

2. The mobile automation apparatus of claim 1, further comprising one or more obstacle avoidance sensors, wherein the navigation controller is further configured to:
   navigate along a first path using the control inputs and the error signals stored in the memory in association with each of the respective segments of the first path;
   when an obstacle is detected in the first path, using the one or more obstacle avoidance sensors: control the navigation module to navigate from a fixed node in the first path to a respective fixed node in a second path to avoid the obstacle, using a branch from the fixed node in the first path to the respective fixed node in the second path; and store, in the memory, the control inputs and the error signals for the navigation module in association with each of the respective segments for the second path; and,
   when the one or more obstacle avoidance sensors indicate that the mobile automation apparatus is past the obstacle: control the navigation module to navigate from a further respective fixed node in the second path to a further fixed node in the first path, using another branch from the further respective fixed node in the second path to the further fixed node in the first path; and store, in the memory, the control inputs and the error signals for the navigation module in association with each of the respective segments for the second path and the first path.

3. The mobile automation apparatus of claim 2, wherein the second path is one or more of: adjacent to the first path; parallel to the first path; and within a given constraint boundary.

4. The mobile automation apparatus of claim 1, further comprising a communication interface configured to receive a destination position in the environment, and wherein the navigation controller is further configured to: generate the path to the destination position using a subset of the plurality of segments.

5. The mobile automation apparatus of claim 1, wherein the navigation controller is further configured to: generate branches at each fixed node in the path when the path is generated.

6. The mobile automation apparatus of claim 1, wherein the navigation controller is further configured to: determine the control inputs and the error signals for the navigation module using a learning controller; and generate the current control inputs using the learning controller.

7. The mobile automation apparatus of claim 1, wherein the navigation controller is further configured to: determine when one or more constraints for navigating the given segment has been violated; and generate the current control inputs that keep the one or more constraints within respective threshold values.

8. The mobile automation apparatus of claim 1, wherein the navigation controller is further configured to change the path when one or more constraints for navigating the respective segments have been violated by navigating along an updated path that meets the one or more constraints.

9. The mobile automation apparatus of claim 1, wherein the reference frame is associated with the environment.

10. The mobile automation apparatus of claim 1, wherein the lattice configuration comprises the fixed nodes arranged in a periodic pattern in at least two orthogonal directions according to a given resolution.

11. The mobile automation apparatus of claim 1, wherein the lattice configuration has a first resolution in a first region of the environment and a second resolution in a second region of the environment.

12. The mobile automation apparatus of claim 1, wherein a resolution of the lattice configuration is dynamic, and the navigation controller is further configured to: change the resolution of the lattice configuration in a region to an updated resolution, and generate new control inputs and determine associated new error signals for each of updated segments in the lattice configuration at the updated resolution.

13. A method comprising:
at a mobile automation apparatus comprising: a memory storing a plurality of segments for a plurality of paths through an environment, each of the plurality of segments being fixed in a reference frame and extending between fixed nodes arranged in a lattice configuration; a navigation module having at least one motor configured to move the mobile automation apparatus in the environment, as navigation occurs a first time along each of respective segments using the navigation module, storing, using the navigation controller, in the memory, control inputs and error signals for the navigation module in association with each of the respective segments;
as navigation occurs at least a second time along a given segment: generating, using the navigation controller, current control inputs for the given segment based on current error signals and the control inputs and the error signals stored in the memory for the given segment;
storing, using the navigation controller, the current control inputs and the current error signals in the memory in association with the given segment; and
generating branches at each fixed node in a path, each of the branches associated with a set of respective control inputs used by the navigation module to navigate from a respective fixed node in the path to one or more fixed nodes in adjacent paths.

14. The method of claim 13, wherein the mobile automation apparatus further comprises one or more obstacle avoidance sensors, and the method further comprises:
navigating, using the navigation controller, along a first path using the control inputs and the error signals stored in the memory in association with each of the respective segments of the first path;
when an obstacle is detected in the first path, using the one or more obstacle avoidance sensors: controlling, using the navigation controller, the navigation module to navigate from a fixed node in the first path to a respective fixed node in a second path to avoid the obstacle, using a branch from the fixed node in the first path to the respective fixed node in the second path; and storing, using the navigation controller, in the memory, the control inputs and the error signals for the navigation module in association with each of the respective segments for the second path; and,
when the one or more obstacle avoidance sensors indicate that the mobile automation apparatus is past the obstacle: controlling, using the navigation controller, the navigation module to navigate from a further respective fixed node in the second path to a further fixed node in the first path, using another branch from the further respective fixed node in the second path to the further fixed node in the first path; and storing, using the navigation controller, in the memory, the control inputs and the error signals for the navigation module in association with each of the respective segments for the second path and the first path.

15. The method of claim 13, wherein the mobile automation apparatus further comprises a communication interface configured to receive a destination position in the environment, and wherein the method further comprises generating, using the navigation controller, the path to the destination position using a subset of the plurality of segments.

16. The method of claim 13, further comprising: determining the control inputs and the error signals for the navigation module using a learning controller; and generating the current control inputs using the learning controller.

17. The method of claim 13, further comprising: determining when one or more constraints for navigating the given segment has been violated; and generating the current control inputs that keep the one or more constraints within respective threshold values.

18. A non-transitory computer-readable medium storing a computer program, wherein execution of the computer program is for:
at a mobile automation apparatus comprising: a memory storing a plurality of segments for a plurality of paths through an environment, each of the plurality of segments being fixed in a reference frame and extending between fixed nodes arranged in a lattice configuration; a navigation module having at least one motor configured to move the mobile automation apparatus in the environment, as navigation occurs a first time along each of respective segments using the navigation module, storing, using the navigation controller, in the memory, control inputs and error signals for the navigation module in association with each of the respective segments;
as navigation occurs at least a second time along a given segment: generating, using the navigation controller, current control inputs for the given segment based on current error signals and the control inputs and the error signals stored in the memory for the given segment;
storing, using the navigation controller, the current control inputs and the current error signals in the memory in association with the given segment; and
generating branches at each fixed node in a path, each of the branches associated with a set of respective control inputs used by the navigation module to navigate from a respective fixed node in the path to one or more fixed nodes in adjacent paths.

* * * * *